(12) United States Patent
Kuchi et al.

(10) Patent No.: US 9,083,399 B2
(45) Date of Patent: Jul. 14, 2015

(54) PRECODING FOR SINGLE TRANSMISSION STREAMS IN MULTIPLE ANTENNA SYSTEMS

(75) Inventors: Kiran Kumar Kuchi, Chennai (IN); Deviraj Klutto Milleth Jeniston, Chennai (IN); Vinod Ramaswamy, Chennai (IN); Baskaran Dhivagar, Chennai (IN); Krishnamurthi Giridhar, Chennai (IN); Bhaskar Ramamurthi, Chennai (IN); Dileep Manisseri Kalathil, Malappuram (IN); Padmanabhan Madampu Suryasarman, Chennai (IN)

(73) Assignee: Centre of Excellence in Wireless Technology, Chennai (IN)

( * ) Notice: Subject to any disclaimer, the term of this patent is extended or adjusted under 35 U.S.C. 154(b) by 274 days.

(21) Appl. No.: 12/999,894

(22) PCT Filed: Jun. 18, 2009

(86) PCT No.: PCT/IN2009/000352
§ 371 (c)(1),
(2), (4) Date: Jan. 21, 2011

(87) PCT Pub. No.: WO2009/153809
PCT Pub. Date: Dec. 23, 2009

(65) Prior Publication Data
US 2011/0141876 A1 Jun. 16, 2011

(30) Foreign Application Priority Data
Jun. 18, 2008 (IN) .......................... 1486/CHE/2008
Jan. 7, 2009 (IN) ............................. 31/CHE/2009

(51) Int. Cl.
*H04J 11/00* (2006.01)
*H04B 7/04* (2006.01)
*H04B 7/06* (2006.01)
(Continued)

(52) U.S. Cl.
CPC ............ *H04B 7/0413* (2013.01); *H04B 7/0617* (2013.01); *H04L 1/004* (2013.01); *H04L 5/0023* (2013.01); *H04L 25/03343* (2013.01);
(Continued)

(58) Field of Classification Search
USPC ......... 370/203, 335, 344; 455/562.1, 88, 101, 455/102; 375/130, 148, 316, 260, 267
See application file for complete search history.

(56) References Cited

U.S. PATENT DOCUMENTS

| | | | |
|---|---|---|---|
| 7,058,002 B1 | 6/2006 | Kumagai et al. | |
| 2004/0001554 A1 | 1/2004 | Sun et al. | |
| 2005/0130684 A1 | 6/2005 | Kim et al. | |
| 2006/0221898 A1* | 10/2006 | Bossert et al. | 370/330 |

(Continued)

FOREIGN PATENT DOCUMENTS

| | | |
|---|---|---|
| EP | 1892987 A1 | 2/2008 |
| WO | 2006135184 A2 | 12/2006 |
| WO | 2008641819 A1 | 6/2008 |

*Primary Examiner* — Andrew Lai
*Assistant Examiner* — Jamaal Henson
(74) *Attorney, Agent, or Firm* — Rahman LLC

(57) ABSTRACT

Precoding for multiple transmission streams in multiple antenna systems. Disclosed herein is a general method that transmits signal from multiple antennas using a one/two dimensional precoder. This precoder is fixed in a given resource block (RB) or slot, which is composed of P subcarriers and Q OFDM symbols (where the values for P and Q are greater than or equal to 1). The precoder in each resource block may take same or different values, which span the two dimensional time-frequency grid. The precoder is chosen as a function of either logical frequency index or physical frequency index of the RB.

27 Claims, 23 Drawing Sheets

(51) Int. Cl.
*H04L 1/00* (2006.01)
*H04L 5/00* (2006.01)
*H04L 25/03* (2006.01)
*H04L 27/26* (2006.01)
*H04L 1/06* (2006.01)

(52) U.S. Cl.
CPC .......... *H04L27/2636* (2013.01); *H04B 7/0478* (2013.01); *H04L 1/0618* (2013.01); *H04L 5/0048* (2013.01)

(56) References Cited

U.S. PATENT DOCUMENTS

| | | | |
|---|---|---|---|
| 2007/0082625 A1* | 4/2007 | Hwang et al. | 455/101 |
| 2007/0133723 A1* | 6/2007 | Cheong et al. | 375/346 |
| 2007/0183386 A1* | 8/2007 | Muharemovic et al. | 370/344 |
| 2007/0195907 A1* | 8/2007 | Wang et al. | 375/267 |
| 2007/0217540 A1 | 9/2007 | Onggosanusi et al. | |
| 2007/0274411 A1 | 11/2007 | Lee et al. | |
| 2008/0090575 A1 | 4/2008 | Barak et al. | |
| 2008/0205552 A1* | 8/2008 | Sartori et al. | 375/316 |
| 2009/0304109 A1* | 12/2009 | Kotecha | 375/299 |
| 2010/0085934 A1* | 4/2010 | Wang et al. | 370/330 |

\* cited by examiner

PRECODING FOR SINGLE TRANSMISSION STREAMS IN MULTIPLE ANTENNA SYSTEMS

FIELD OF INVENTION

This invention relates to wireless communications, and more particularly to using multiple transmission antennas in wireless communications.

BACKGROUND OF INVENTION

A wireless network generally comprises of many smaller region called a cell that is further divided in to multiple sectors. Each cell/sector may have a base station (BS) and multiple mobile stations (MSs). The MSs in a sector may be fixed, nomadic or mobile. Communication from a BS to a MS is called as downlink or forward link. Similarly, communication from an MS to a BS is called as uplink or reverse link.

The radio frequency signal transmitted from the BS will travel through multiple paths before reaching the MS or vice versa. This results in the superposition of different multi-path signals, adding constructively and destructively at the receiver. The time varying nature of the mobile channel is due to the multipath time dispersion, doppler shift, and random phase modulation. Resolving the multipaths becomes difficult in system operating at very high carrier frequencies. The un-resolvable multiple paths contribute to fading and the resolvable multiple paths lead to inter-symbol interference (ISI). The presence of these resolved multipath components lead to the frequency selective nature of the wireless channel.

The problem of fading is overcome by providing multiple replicas of the transmitted signal to the receiver(s). This can be done by transmitting same (space-time coded) signals through all transmit antennas during the same time interval or at different time intervals to the receiver and/or by obtaining multiple replicas of the transmitted signal using multiple receivers. This is called as antenna diversity. This will ensure that less attenuated signal is available at the receiver under the assumption that the fading across the antennas are uncorrelated.

Cyclic delay diversity (CDD) is a scheme in which the cyclic shift of the first antenna is set to zero, while an antenna specific cyclic shift is applied to the remaining antennas. The cyclic shift is done after the N-point IFFT of the OFDM transmitter. The time domain CDD and the frequency domain phase diversity equivalent of a CDD signal is given by $$\underbrace{s(t-\delta_{n_T})}_{CDD\ Signal} = \frac{1}{\sqrt{N}} \sum_{n}^{N-1} \underbrace{e^{-j\frac{2\pi}{N}n\delta_n}S(n)}_{PhaseDiversitySignal} e^{-j\frac{2\pi}{N}nt}$$

Where $\delta_{n_T}$ is the antennas specific delay, N is the size of the IFFT. Note that in CDD the phase is varied on every subcarrier depending on the subcarrier index.

Space-time block coding (STBC) is a technique in which the signals to be transmitted will be coded across space (antennas) and time. When the encoding is done across space and frequency resource, it is called space-frequency block coding (SFBC). A STBC scheme with two transmit antennas is described below.

Signal $s_1$ is transmitted through the first antenna and $s_2$ is transmitted through the second antenna in time instant t and signal $-s_2^*$ is transmitted through the first antenna and $s_1^*$ is transmitted through the second antenna in next time instant t+T, where T is the symbol duration. The received signals $r_1$ and $r_2$ in two adjacent time instants is given by $$\begin{pmatrix} r_1 \\ r_2 \end{pmatrix} = \begin{pmatrix} s_1 & s_2 \\ -s_2^* & s_1^* \end{pmatrix} \begin{pmatrix} h_1 \\ h_2 \end{pmatrix} + \begin{pmatrix} n_1 \\ n_2 \end{pmatrix}$$

After complex conjugating the received signal $r_2$, the above equation can be written as $$\begin{pmatrix} r_1 \\ r_2^* \end{pmatrix} = \begin{pmatrix} h_1 & h_2 \\ h_2^* & -h_1^* \end{pmatrix} \begin{pmatrix} s_1 \\ s_2 \end{pmatrix} + \begin{pmatrix} n_1 \\ n_2^* \end{pmatrix}$$

It can be easily shown that the channel matrix is orthogonal, and the receiver processing to detect $s_1$ and $s_2$ is linear. In case of SFBC, two frequency resources in one time instant are used instead of two time instants. The above scheme or its variant can be extended to arbitrary number of antennas.

Techniques like space-time block codes (STBC) and space frequency block codes (SFBC) have better performance as compared to CDD. In conventional STBC/SFBC schemes, distinct pilot tones are transmitted on different antennas which results in a high pilot overhead. STBC/SFBC schemes also require higher complexity during implementation. In ISI channels, the performance of Cyclic Delay Diversity (CDD) is generally poor. Phase diversity schemes are generally applicable to TDMA systems only. Phase diversity schemes are also restricted to one-dimension in time.

SUMMARY OF INVENTION

Accordingly the invention provides a method and system for transmission of a signal from a plurality of antennas, the method further comprising steps of splitting frequency band of the signal into a plurality of subcarriers, wherein the subcarriers span frequency and time; and transmitting each of the subcarriers from the plurality of antennas, each subcarrier transmitted on each antenna using a complex weight specific to the antenna, wherein the complex weight further relies on atleast one of time index of the subcarrier; frequency index of the subcarrier; and time and frequency indices of the subcarrier.

Also provided herein is a method and system for selection of a precoder for a signal, said method comprising steps of dividing available bandwidth of said signal into frequency partitions, wherein said frequency partition is further divided into a plurality of frequency sub-partitions, each of said frequency sub-partitions comprising of a plurality of Physical Resource Units (PRUs); grouping said plurality of PRUs into sets, wherein each said set comprise of an arbitrary number of PRUs; further classifying said sets into a plurality of sets, where elements of said sets comprises of L physically contiguous PRUs, where L is greater or equal to 1 and may vary with each of said sets; assigning each element of said sets a logically contiguous index i, wherein i takes values from 0, 1, 2, ... $N_L$−1, where $N_L$ may vary for each of said sets; determining a precoding matrix W(i,q) of size Nt×1 for each element of a set chosen from said plurality of sets, where Nt is number of transmitting antennas and said element comprises of a plurality of PRUs; applying a precoding matrix to each element of said set to obtain said precoder, and W(i,q) is same for all PRUs contained in said element.

Embodiments herein disclose a method and system for single stream transmission for $N_t$ transmission antennas comprising of transmitting elements of y simultaneously from said $N_t$ antennas, where $y=W(p,q)s_{k,l}$, further wherein $S_{k,l}$ denotes signal present in kth subcarrier and the lth OFDM symbol contained in the (p,q)th unit of said stream, p is frequency index of y, q is time index of y and W(p,q) is a $N_t \times 1$ vector.

Also disclosed is an OFDM receiver comprising of a baseband portion, where said OFDM receiver receives a precoded signal comprising of precoded pilot tones and precoded data tones, further where said precoded signal relies on atleast one of time index of a subcarrier of said precoded signal; frequency index of said subcarrier; and time and frequency indices of said subcarrier and is transmitted using a plurality of antennas, said baseband portion further comprising of atleast one means adapted for estimating channel state information using said precoded pilot tones; estimating interference covariance estimation using said precoded pilot tones; demodulating said precoded data tones; and computing filter weights using said channel state information and said interference covariance estimation.

Disclosed herein is a DFT-S-OFDMA receiver comprising of a baseband portion, where said receiver receives a precoded signal comprising of precoded pilot tones and precoded data tones, further where said precoded signal relies on atleast one of time index of a subcarrier of said precoded signal; frequency index of said subcarrier; and time and frequency indices of said subcarrier and is transmitted using a plurality of antennas, said baseband portion further comprising of atleast one means adapted for estimating channel state information using said precoded pilot tones; estimating interference covariance estimation using said precoded pilot tones; demodulating said precoded data tones; and computing filter weights using said channel state information and said interference covariance estimation.

Embodiments herein disclose a method and system for transmitting a DFT-S-OFDMA stream from a plurality of transmitting antennas, said method comprising steps of applying DFT precoding to an input stream of subcarriers; applying a multi-antenna precoder scheme to each of said subcarriers to create a plurality of precoded subcarriers, wherein said multi-antenna precoder scheme is atleast one of 1-Dimensional Phase Offset Diversity (1D-POD); antenna switching in frequency; antenna switching in time; antenna switching in time and frequency; and a combination of 1D-POD and antenna switching; applying an IDFT to said plurality of precoded subcarriers to produce a plurality of signals; and transmitting a signal chosen from said plurality of signals using an antenna chosen from said plurality of antennas, wherein said antenna is specific to said signal and each of said plurality of signals is transmitted from a distinct antenna chosen from said plurality of antennas.

Disclosed herein is a method and system for transmitting a DFT-S-OFDMA stream from a plurality of transmitting antennas, said method comprising steps of applying DFT precoding to an input stream of subcarriers, wherein said subcarriers comprise of Physical Resource Units (PRUs); performing subcarrier mapping on said subcarriers; performing IDFT on output of said subcarriers; adding cyclic prefix to said subcarriers; transmitting said subcarriers from a first antenna from said plurality of transmitting antennas; transmitting said subcarriers multiplied with a PRU specific phase rotation from a second antenna from said plurality of transmitting antennas; and transmitting said subcarriers multiplied with a phase rotation from subsequent antennas, wherein said phase rotation relies on PRU and specific antenna.

Disclosed herein is a method and system for transmitting a DFT-S-OFDMA stream from a plurality of transmitting antennas, said method comprising steps of applying DFT precoding to an input stream of subcarriers; performing subcarrier mapping on said subcarriers; multiplying each of said subcarriers with a plurality of complex weights, where said number of plurality of said complex weights is equal to number of said plurality of transmitting antennas; performing IDFT on each of said subcarriers to create a plurality of signals; and transmitting said plurality of signals from said plurality of antennas, wherein each signal is transmitted from a distinct antenna.

Embodiments herein disclose a method and system for transmitting a DFT-S-OFDMA stream from a plurality of transmitting antennas, said method comprising steps of modulating FEC encoded data; splitting said modulating FEC encoded data into a plurality of data sets, where number of said plurality of data sets is equal to said number of said plurality of antennas; modulating each of said plurality of data sets onto contiguous subcarriers; encoding each of said plurality of data sets using a DFT-S-OFDMA transmitter; transmitting each of said plurality of data sets on distinct antennas chosen from said plurality of antennas.

Also, disclosed herein is a method and system for transmitting a DFT-S-OFDMA stream from a plurality of transmitting antennas, said method comprising steps of modulating FEC encoded data; splitting said modulating FEC encoded data into a plurality of data sets, where number of said plurality of data sets is equal to said number of said plurality of antennas; performing DFT operation on each of said data sets to create a set of DFT precoded data; modulating each of said DFT precoded data onto contiguous subcarriers to create DFT precoded data sets; precoding each of said plurality of DFT precoded data sets using a multi-antenna precoder for a subset of said plurality of antennas to create a plurality of multi-antenna DFT precoded data streams; performing IDFT on each of said plurality of plurality of multi-antenna DFT precoded data streams to obtain multi-antenna precoded data streams; mapping said multi-antenna precoded data streams to said plurality of antennas; transmitting each of said plurality of multi-antenna precoded data streams on distinct antennas chosen from said plurality of antennas.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF FIGURES

This invention is illustrated in the accompanying drawings, through out which like reference letters indicate corresponding parts in the various figures. The embodiments herein will be better understood from the following description with reference to the drawings, in which.

DETAILED DESCRIPTION OF INVENTION

Figure 1:
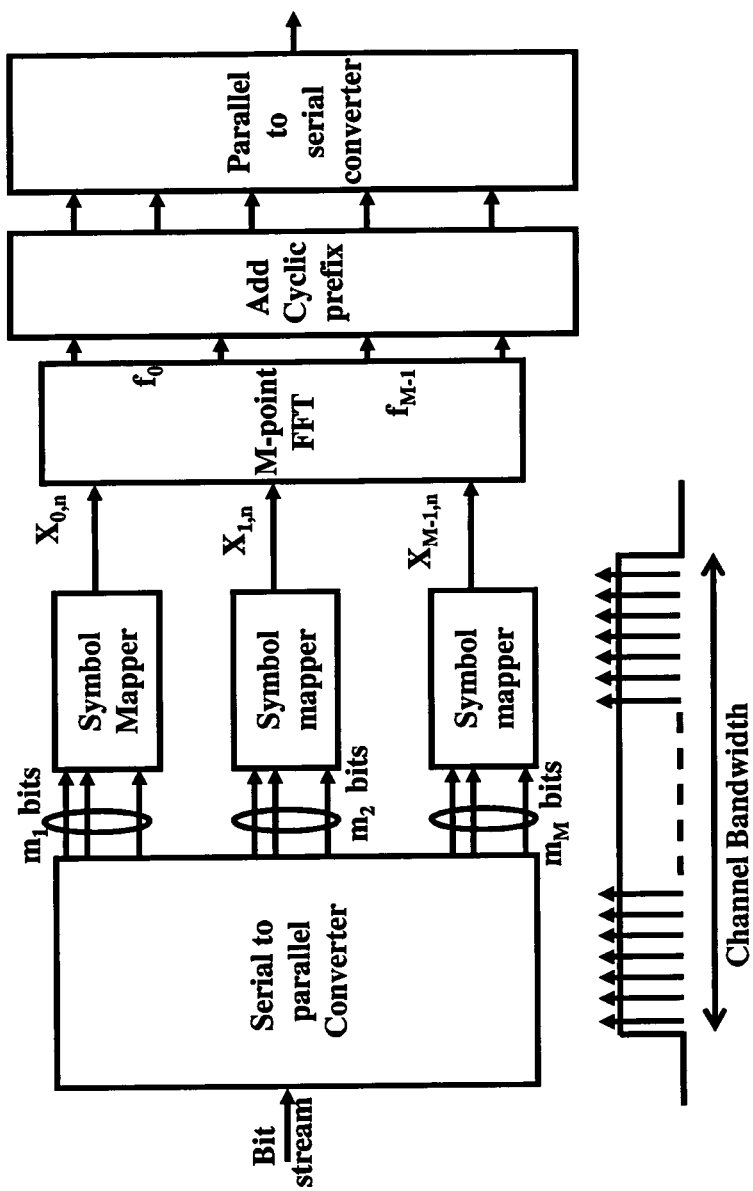
FIG. 1 depicts the block diagram of an OFDMA based system, according to embodiments as disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve transmit diversity and precoding using multiple antennas in wireless networks. Referring now to the drawings, and more particularly to FIGS. 1 through 23, where similar reference characters denote corresponding features consistently throughout the figures, there are shown preferred embodiments.

The IEEE 802.16e Wireless Metropolitan Area Network (MAN) is a broadband wireless standard that uses Orthogonal Frequency Division Multiplexing Access (OFDMA) technology for both downlink and uplink transmissions. The block diagram of an OFDMA based system is shown in FIG. 1.

The physical subcarriers are grouped to form a sub-channel, which consists of a set of subcarriers. In the downlink, a sub-channel may be intended for different (groups of) users; in the uplink, a transmitter may be assigned one or more sub-channels, several transmitters may transmit simultaneously. The PSK/QAM input data are mapped to distinct subcarriers, and filled with zeros in the unused subcarriers before taking an N-point IDFT. The subcarriers forming one sub-channel may, but need not be adjacent. When they are adjacent, channel dependent scheduling (CDS) can improve the throughput. When they are not adjacent but distributed over the complete bandwidth (for instance, in a pseudo-random fashion that can include fast hopping across the tones), interference from adjacent tones is averaged and frequency diversity is exploited inherently. The total available physical channel is divided into logical sub-channels to support scalability, multiple accesses.

The distributed resource unit (DRU) contains a group of subcarriers which are spread across the distributed resource allocations within a frequency partition. The size of the DRU equals the size of PRU, i.e., P subcarriers by Q OFDMA symbols. The minimum unit for forming the DRU is equal to either a single subcarrier or a pair of subcarriers, called tone-pair.

The localized resource unit, also known as contiguous resource unit (CRU) contains a group of subcarriers which are contiguous across the localized resource allocations. The minimum size of the CRU equals the size of the PRU, i.e., P subcarriers by Q OFDMA symbols. When the number of PRUs in a CRU is 1 or 2, it is called as a miniband CRU, and when the number of PRUs in a CRU is 3 or more, it is called as a subband CRU. The minibands CRUs available in a frequency partition can be divided into two groups. The first group can be used as miniband CRU itself, and the second group will be used to create subcarrier or pairs of subcarrier permuted distributed resource unit (DRU).

Figure 2:
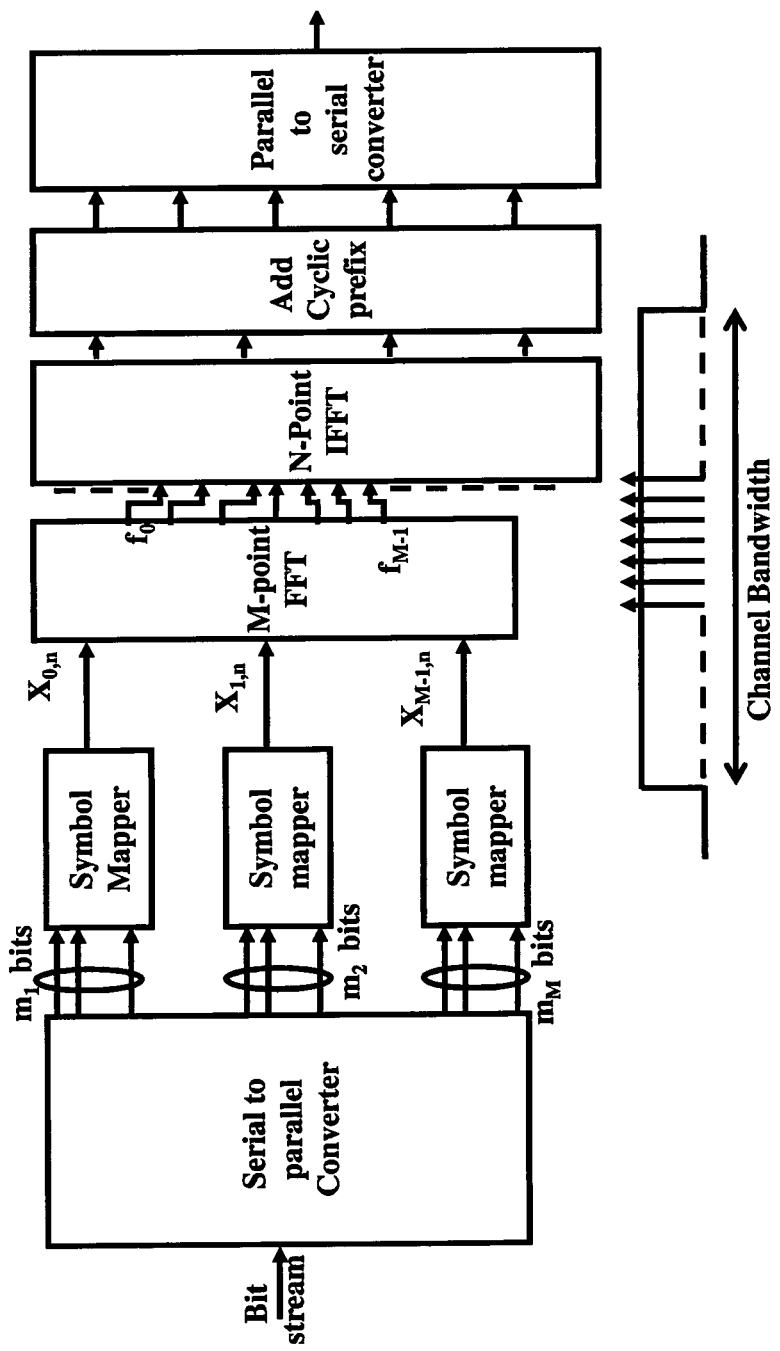
FIG. 2 depicts a localized LTE system using the DFT-S-OFDMA framework, according to embodiments as disclosed herein.
Figure 3:
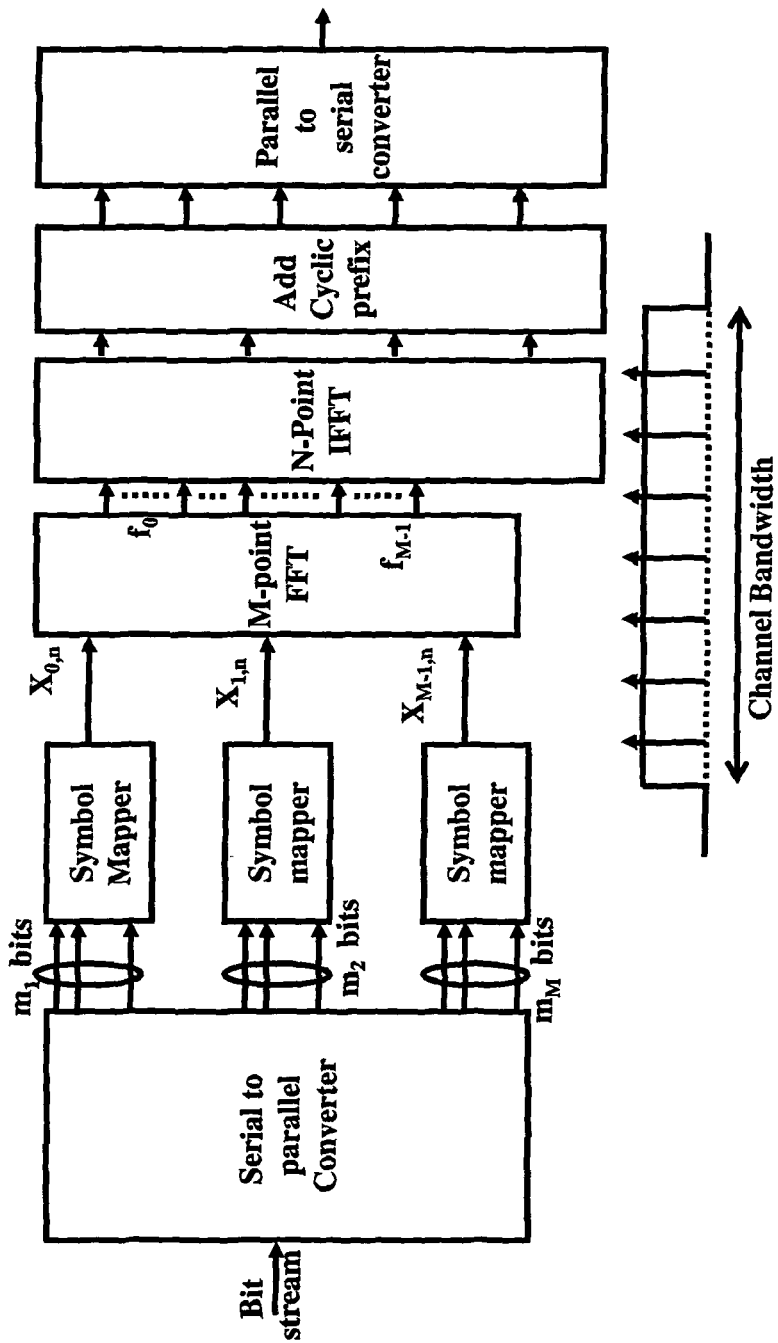
FIG. 3 depicts a distributed LTE system using the DFT-S-OFDMA framework, according to embodiments as disclosed herein.

3GPP-LTE is a standard that uses a variant of OFDMA called as DFT-spread-OFDMA (DFT-S-OFDMA). The frequency domain transmitter implementation of an LTE system using the DFT-S-OFDMA framework is shown in FIG. 2. An M-point FFT is applied to the PSK/QAM input data and the outputs of the FFT are mapped to distinct subcarriers, and filled with zeros in the unused subcarriers before taking an N-point IDFT with N>M. The mapping of subcarriers can be either localized or distributed in frequency domain. The mapping of subcarriers can be either localized as in FIG. 2 or distributed as in FIG. 3.

Figure 4:
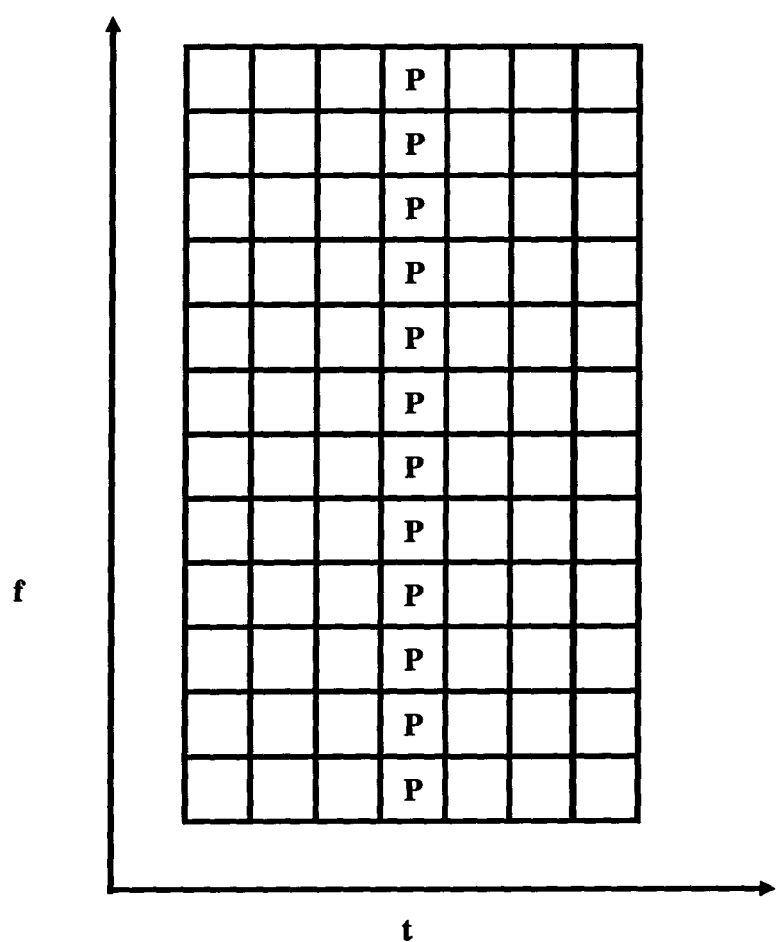
FIG. 4 depicts a typical slot format for localized/distributed SC-FDMA, according to embodiments as disclosed herein.

In the uplink of LTE which uses DFT-S-FDMA, the basic packet resource unit (PRU) which is also called a tile may is composed of P subcarrier and 7 OFDM symbols. A physical resource unit (PRU) is the basic physical unit for resource allocation that comprises P consecutive subcarriers by Q consecutive OFDMA symbols. A Typical value for P is 18 subcarriers and Q is 5 or 6 or 7 OFDMA symbols. A logical resource unit (LRU) is the basic logical unit for distributed and localized resource allocations. An LRU is P·Q subcarriers. The LRU includes the pilot tones that are used in a PRU. The effective number of subcarriers in an LRU depends on the number of allocated pilots. A typical slot format for localized/distributed SC-FDMA, which is used in the 3GPP-LTE standard, is shown in FIG. 4. The slots denoted by P are slots which contain allocated pilots.

A typical slot format for localized/distributed DFT-S-OFDMA comprises of 12*m subcarriers in frequency and 7-OFDM symbols, where "m" is a positive integer. Pilot tones are transmitted in the fourth OFDM symbol. The remaining 6 OFDM symbols are used for transmission of DFT-S-OFDMA data tones. In LTE, pilot symbols do not use DFT spreading. The pilot tones are directly modulated using constant-amplitude-zero-auto-correlation (CAZAC) sequences which has low peak-to-average-power-ratio (PAPR). In DFT-S-OFDMA, the number of allocated tones in a slot is generally an integer multiple of 12. Therefore, in LTE, the Uplink slot comprises of P subcarriers in frequency and 7 OFDM symbols.

In LTE, data is typically allocated in pairs of slots which are contiguous in time. Therefore, for channel estimation purposes, the receiver may use two pilot OFDM symbols which are separated in time. A 2D-MMSE channel estimation algorithm can be used to track the channel variation both in frequency and time.

In multi-user systems, resources are allocated in time and frequency dimensions, where the basic signal is confined to one OFDM symbol that spans N subcarriers spanning entire bandwidth.

A basic unit for transmission is a slot which is composed of P subcarriers and Q OFDM symbols. Data is allocated in terms of slots which are either contiguous (localized) or scattered (distributed) in a two dimensional time-frequency grid that contains N subcarriers and M OFDM symbols where (N>>P and M>>Q). P and Q may be greater than one. Each slot is designated by the two dimensional index (p,q) where p is the frequency index and q is the time index and p=1, 2, ..., Nf, q=1, 2, ... Nt. Nt is equal to the total number slots in time axis. Nf is equal to the total number slots in frequency axis. Nt+Nf is equal to the total number of allocated slots. For example slot (1,1) and (1,2) are two adjacent slots in time and slot (1,1) and (2,1) are two adjacent slots in frequency. The size of the basic resource unit in the uplink can be same or different from that of the downlink i.e., the pair P and Q in the uplink can be same or different from that of the downlink.

In a practical system, the frequency slot index p represents the logical set of frequency slots allocated in a given frequency partition. In other words, the index p, may represent physically contiguous frequency slots, or physically non-contiguous (distributed) frequency slots which are scattered in entire frequency band or a given frequency partition.

Q (Q=5 or 6 or 7) OFDM symbols are grouped to form a sub-frame in IEEE 802.16m standards, and there are eight such sub-frames in a 5 millisecond frame. However, 2Q (Q=7) OFDM symbols are grouped to form a sub-frame in 3GPP-LTE standards, and there are 10 such sub-frames in a 10 millisecond frame.

Figure 5:
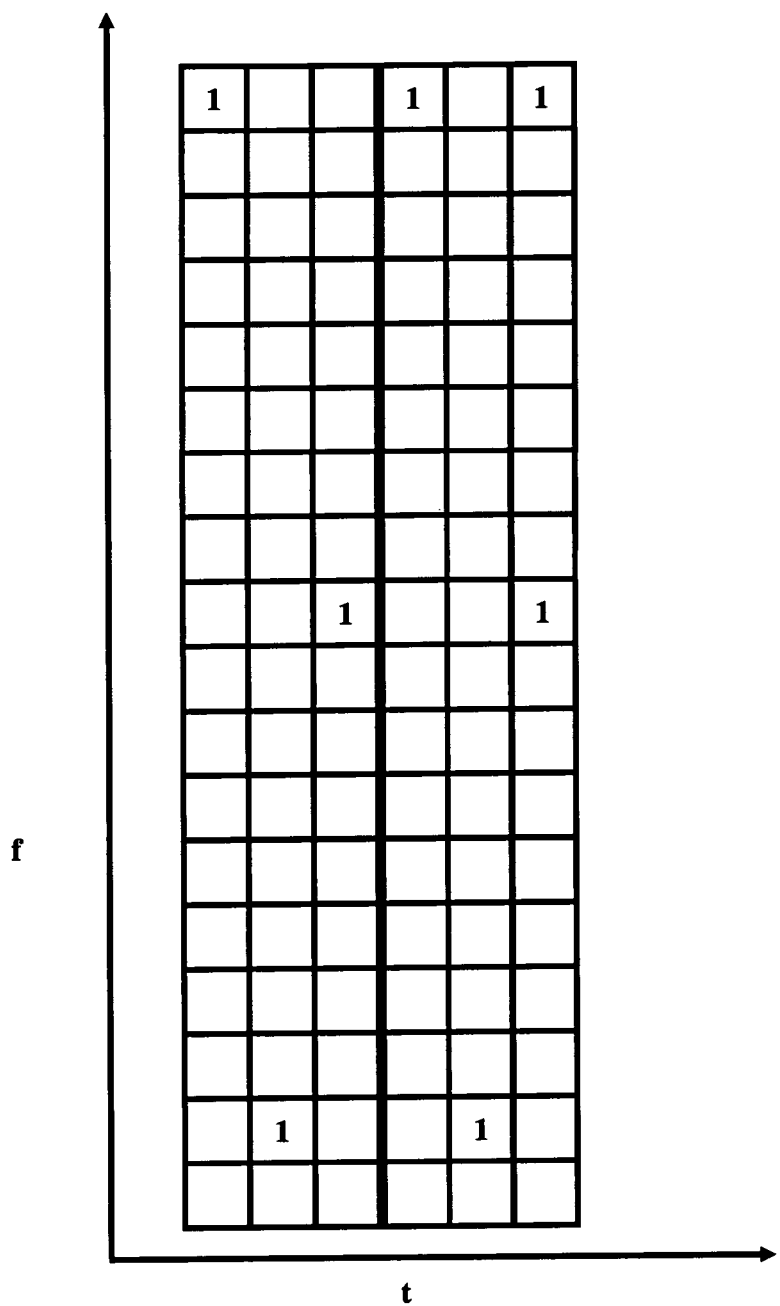
FIG. 5 illustrates an example of RB or PRU structure used in DL of 16 m, according to embodiments as disclosed herein.

In the downlink of IEEE 802.16m, the basic packet resource unit (PRU) may be composed of 18 subcarrier and 6 OFDM symbols. DL of 16 m uses OFDMA. FIG. 5 illustrates an example of RB or PRU structure used in DL of 16 m. In each PRU certain subcarriers are reserved for pilot tones which are used for estimating the channel between the transmitter and receiver. FIG. 5 illustrates an example of Resource Block (RB) or PRU structure used in DL of 16 m. The resource allocated to a user or a group of users will be in multiple of the basic resource units, and it can be either contiguous or distributed. N1 contiguous basic resource unit is called as sub-band, and N2 contiguous resource unit is called as miniband in IEEE 802.16m standards. N1 and N2 are positive integers. Typical number for N1 is 3 or 4 or 5 and N2 is 1 or 2.

The embodiments herein disclose a method for transmission of a signal from multiple antennas using a one or two dimensional precoder. The precoder may take same or different values in different slots, which span the two dimensional time-frequency grid.

Figure 6:
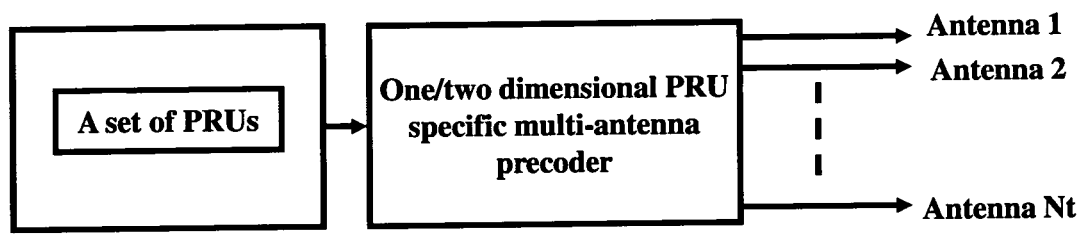
FIG. 6 the general structure of PRU/slot specific 2D-precoder implementation, according to embodiments as disclosed herein.

Embodiments herein disclose a technique for single stream transmission for $N_T$ transmit antennas as:

$$y = W(p,q)s_k$$

Where $s_k$ denotes the data/pilot transmitted in the kth subcarrier contained in the (p,q)th RB/slot/PRU, and W(p,q) is typically a ($N_T \times 1$) vector. The elements of y will be transmitted from $N_T$ antennas simultaneously. FIG. 6 illustrates the general structure of PRU/slot specific 2D-precoder implementation.

For a system with two transmit antennas, an embodiment herein discloses a 2-phase offset diversity scheme designated by $$A = \begin{bmatrix} s_k \\ s_k e^{j\Phi(p,q)} \end{bmatrix} \begin{matrix} \xrightarrow{Ant1} \\ \xrightarrow{Ant2} \end{matrix}$$

Where $s_k$ denotes the kth data/pilot subcarrier contained in the (p,q)th slot and $\Phi(p,q)$ is the phase rotation applied in the (p,q)th slot. The rows of the vector A will be transmitted simultaneously from antennas 1 and 2 respectively. The signal which is transmitted on each antenna may be weighed by a constant amplitude or phase weight which is common for all antennas.

$\Phi(p,q)$ may be expressed as $\Phi(p,q)=\Phi(p)+\Phi(q)$ where $\Phi(p)$ is the phase rotation which is applied in the slot whose frequency index is p and $\Phi(q)$ is the phase rotation of the slot whose time index is q. The slot dependent phase offsets $\Phi(p)$ and $\Phi(q)$ can be jointly chosen such that the total diversity benefit is maximized. An example of a phase offset pattern for localized allocation spanning 4-slots is provided in Table-1. Since this scheme de-correlates the channel in both time and frequency directions simultaneously, better performance is obtained as compared to CDD or time dependent phase diversity.

TABLE 1

| | |
|---|---|
| $\Phi(1,1) = 0$ | $\Phi(1,2) = \dfrac{\pi}{2}$ |
| $\Phi(2,1) = \pi$ | $\Phi(2,2) = \dfrac{3\pi}{2}$ |

The same pilot tone is transmitted from both antennas with slot specific 2D phase rotation, resulting in a pilot overhead half that of the STBC/SFBC. Pilot structures which are designed for single antenna systems can be used. The 2 Dimensional-Phase Offset Diversity (2D-POD) receiver performs channel estimation just as in single (virtual) antenna mode and estimates the equivalent channel from two antennas, resulting in lower implementation complexity.

Figure 7:
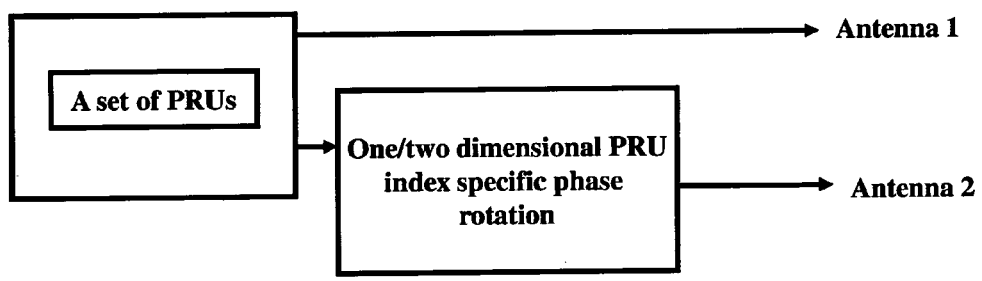
FIG. 7 depicts the POD method, according to embodiments as disclosed herein.
Figure 8:
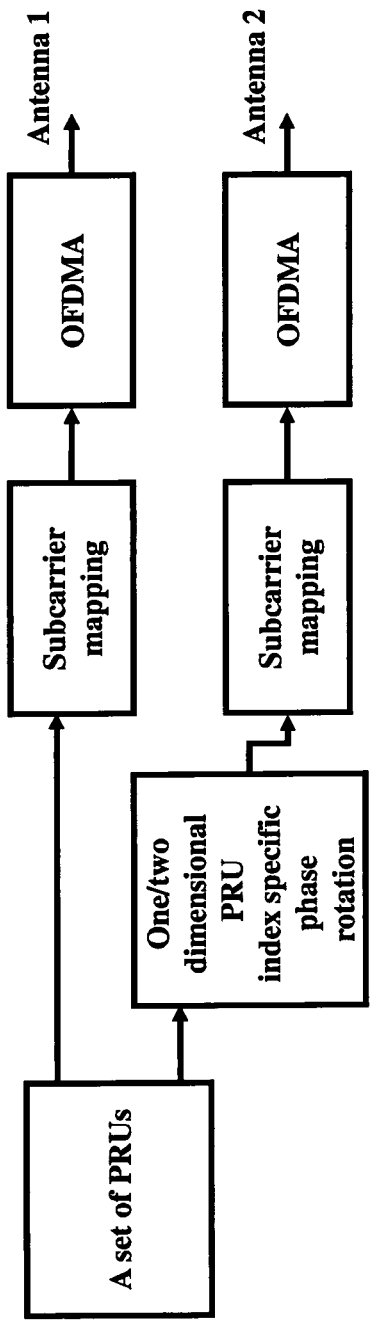
FIG. 8 depicts the POD method, according to embodiments as disclosed herein.
Figure 9:
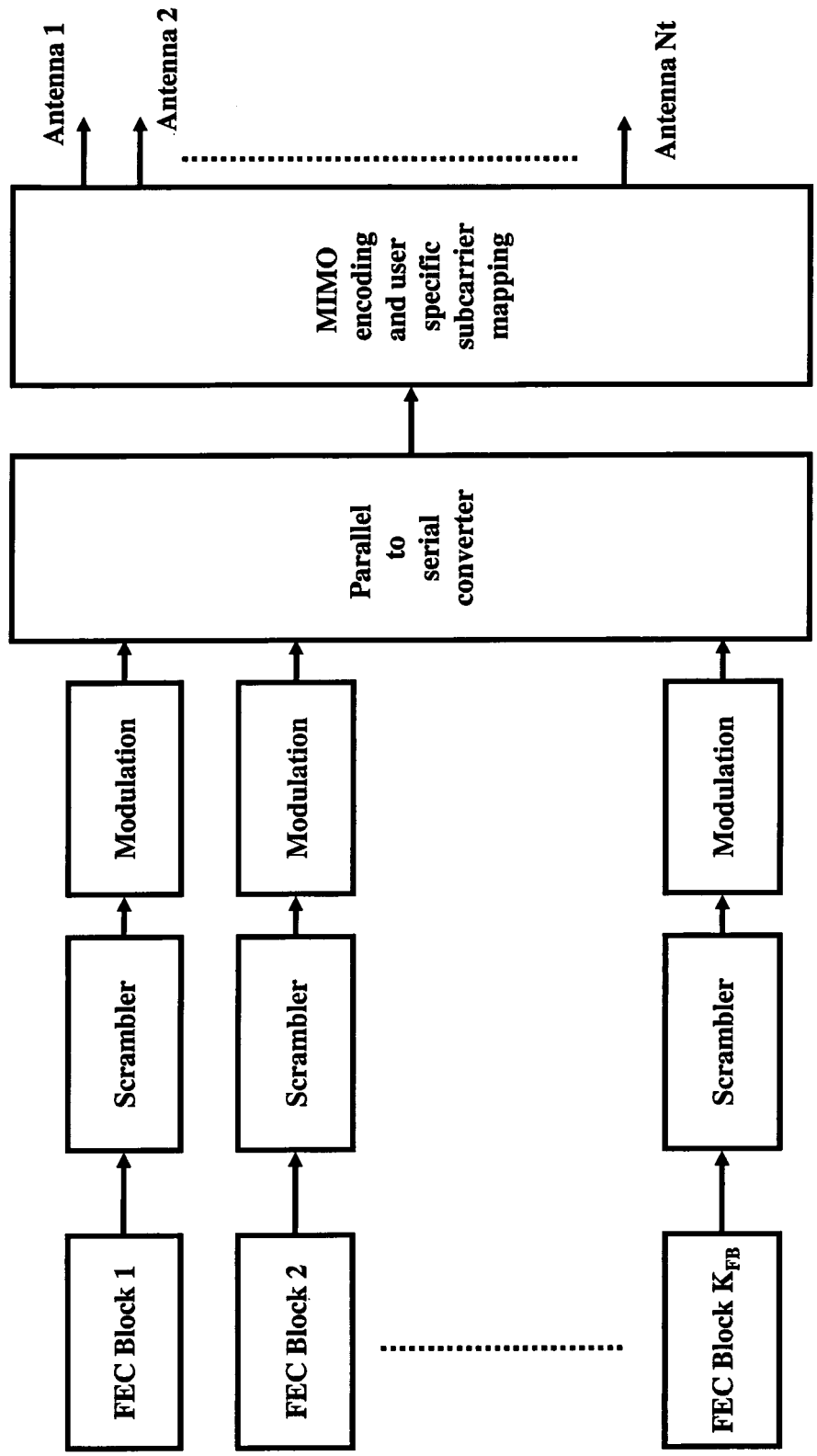
FIG. 9 illustrates the general structure of OFDMA transmitter which uses multi-antenna precoding, according to embodiments as disclosed herein.

FIGS. 7 and 8 illustrate the POD method. FIG. 9 illustrates the general structure of OFDMA transmitter which uses, multi-antenna precoding. In FIG. 9, one or several forward error correction (FEC) coded streams are transmitted. Output bits of each FEC block is scrambled using a cell specific scrambling code and the output bits are mapped to modulation data. Modulation data of several FEC blocks is multiplexed into a single modulation stream. Data symbols of each user are mapped to physical subcarriers of PRUs allocated for that user using a MIMO encoder. Pilot tones are inserted in the PRU as shown in FIG. 5 for single stream case. In FIG. 9, after MIMO encoding, the baseband signal corresponding to each antenna branch is used to generate an analog OFDM signal i.e., the output of each antenna branch goes through IDFT, CP insertion, D/A, RF up conversion, power amplification steps.

In an embodiment of 1D/2D POD, the phase $\Phi_2(p)$ can be chosen based on the number of slots $R_a$ allocated to a user along the frequency direction. The phase can be chosen as $$\Phi_2(p) = e^{j2\pi \frac{(p-1)}{R_a}}$$

where p=1, 2, . . . , $R_a$ is the slot index along the frequency direction. The phase $\Phi_2(q)$ can be chosen from a predefined set depending on the slot index q along the time direction, and this phase is kept same across the frequency direction. The following sets $$0, \pi \text{ or } 0, \pi, \frac{\pi}{2}, \frac{3\pi}{2} \text{ or } 0, \pi, \frac{\pi}{2}, \frac{3\pi}{2}, \frac{\pi}{4}, \frac{5\pi}{4}, \frac{3\pi}{4}, \frac{7\pi}{4}$$

are some typical examples.

In another preferred embodiment, the phase values, which are allocated in a particular slot is based on the slot index (p,q) can be fixed in the frame or sub-frame in a predetermined manner, and this can be specified for different bandwidths or frequency partitions. The phase values can be chosen as defined above for the frequency and time direction. However, in this case the allocated phase patterns are frame specific and not user specific, and this will depend on the system bandwidth or frequency partitions.

The frequency dependent phase offset can be specified as a function of slot index only i.e., any user allocated in that slot will use that predefined phase offset value. For a given time index q, the following sequence of phase values can be used in successive frequency slots:

$$\left[0, \pi, \frac{\pi}{2}, \frac{3\pi}{2}\right].$$

Other possible sequences are:

$$0 \pi \text{ or } 0, \frac{\pi}{2}, \pi, \frac{3\pi}{2} \text{ or } 0, \pi, \frac{\pi}{2}, \frac{3\pi}{2}, \frac{\pi}{4}, \frac{5\pi}{4}, \frac{3\pi}{4}, \frac{7\pi}{4},$$

but not limited to these set of phase values. In general, this can be obtained from any M-ary PSK constellation. One of the above mentioned sequence is repetitively assigned when the given frequency resource (number of slots) exceeds the number of different phase values. An example of frequency dependent phase allocation is shown in Table-2. Table 2 depicts an allocation for 4 slots in frequency. The allocations for remaining frequency slots can be obtained from the base pattern, which can be repeated in the rest of the frequency slots.

TABLE 2

| (p, q) | q |
|---|---|
| p | 0 |
| p + 1 | $\frac{\pi}{2}$ |
| p + 2 | $\pi$ |
| p + 3 | $\frac{3\pi}{2}$ |

The time dependent phase offset $\Phi_2(q)$ can be obtained in one of the following ways:

For a given frequency index p, the phase difference between successive time dependent phase offsets is equal to a fixed value i.e., $|\Phi_2(q+1)-\Phi_2(q)|=\theta_0$ Where $\theta_0$ takes any value in the range $(0,2\pi)$. Preferred values are $$\theta_0 \in \left[0, \frac{\pi}{4}, \frac{\pi}{2}, \pi, \frac{5\pi}{4}, \frac{3\pi}{2}, \frac{7\pi}{4}\right].$$

In an embodiment, one may use a phase difference of $\pi$ between any pairs of adjacent time slots. An example of 2D-phase allocation is shown in Tables 3 and 4 for $\theta_0=\pi$ and $\pi/3$, respectively. These tables show an allocation for 4 slots in frequency. The allocations for remaining frequency slots can be obtained from the base pattern, which can be repeated in the rest of the time/frequency slots.

TABLE 3

| (p, q) | q | q + 1 | q + 2 | q + 3 |
|---|---|---|---|---|
| p | 0 | $\pi$ | 0 | $\pi$ |
| p + 1 | $\frac{\pi}{2}$ | $\frac{3\pi}{2}$ | $\frac{\pi}{2}$ | $\frac{3\pi}{2}$ |
| p + 2 | $\pi$ | 0 | $\pi$ | 0 |
| p + 3 | $\frac{3\pi}{2}$ | $\frac{\pi}{2}$ | $\frac{3\pi}{2}$ | $\frac{\pi}{2}$ |

TABLE 4

| (p, q) | q | q + 1 | q + 2 |
|---|---|---|---|
| p | 0 | $\frac{\pi}{3}$ | $\frac{2\pi}{3}$ |
| p + 1 | $\frac{\pi}{2}$ | $\frac{5\pi}{6}$ | $\frac{7\pi}{6}$ |
| p + 2 | $\pi$ | $\frac{4\pi}{3}$ | $\frac{5\pi}{3}$ |
| p + 3 | $\frac{3\pi}{2}$ | $\frac{11\pi}{6}$ | $\frac{13\pi}{6}$ |

In another embodiment, one may use a phase difference of π within a block, where a block is obtained by concatenating two adjacent time slots. An example of 2D-phase allocation is shown in Table 5.

TABLE 5

| (p, q) | q | q + 1 | q + 2 | q + 3 |
|---|---|---|---|---|
| P | 0 | π | $\frac{\pi}{2}$ | $\frac{3\pi}{2}$ |
| p + 1 | $\frac{\pi}{2}$ | $\frac{3\pi}{2}$ | π | 0 |
| p + 2 | π | 0 | $\frac{3\pi}{2}$ | $\frac{\pi}{2}$ |
| p + 3 | $\frac{3\pi}{2}$ | $\frac{\pi}{2}$ | 0 | π |

In yet another embodiment, one may use the following technique. For a given frequency index p, the phase offset can be kept constant for several consecutive slots and then its takes a new value which lies in the range (0,2π). An example is shown in Table-6.

TABLE 6

| (p, q) | q | q + 1 | q + 2 | q + 3 |
|---|---|---|---|---|
| P | 0 | 0 | π | π |
| p + 1 | $\frac{\pi}{2}$ | $\frac{\pi}{2}$ | $\frac{3\pi}{2}$ | $\frac{3\pi}{2}$ |
| p + 2 | π | π | 0 | 0 |
| p + 3 | $\frac{3\pi}{2}$ | $\frac{3\pi}{2}$ | $\frac{\pi}{2}$ | $\frac{\pi}{2}$ |

In another embodiment herein, cyclic delay diversity (CDD) may be employed on the second antenna together with a slot dependent phase offset which is a function of time index p only. If the delay is chosen to be D time samples and Δf is the subcarrier width, the CDD+POD diversity scheme may be represented as:

$$A = \begin{bmatrix} s_k \\ s_k e^{j2\pi k \Delta_f D} e^{j\Phi(q)} \end{bmatrix} \begin{matrix} \xrightarrow{Ant1} \\ \xrightarrow{Ant2} \end{matrix}$$

CDD+POD may be applied for distributed allocations by choosing a delay which is less than the cyclic prefix (CP) length In another implementation CDD+POD may be implemented as:

$$A = \begin{bmatrix} s_k \\ s_k e^{j\phi k} e^{j\Phi(q)} \end{bmatrix} \begin{matrix} \xrightarrow{Ant1} \\ \xrightarrow{Ant2} \end{matrix}$$

Where Φ is a pre-defined phase and k is subcarrier index.

In system with 4 transmit antennas, the 2D-POD scheme may be generalized as:

$$A = \begin{bmatrix} s_k \\ s_k e^{j\Phi(p,q)} \\ s_k e^{j\Psi(p,q)} \\ s_k e^{j\Theta(p,q)} \end{bmatrix}$$

where distinct phase rotations are applied on different antennas in each slot. The signal which is transmitted on each antenna may be weighed by a constant amplitude or phase weight which is common for all antennas.

In Table 7, an example phase pattern is given for 4-antenna 2D-POD. The proposed scheme can be generalized for arbitrary number of antennas where each antenna uses a different slot wise 2D-phase rotation.

TABLE 7

| | |
|---|---|
| Φ(1, 1) = 0, Ψ(1, 1) = 0, Θ(1, 1) = 0 | Φ(1, 2) = π, Ψ(1, 2) = 0, Θ(1, 2) = π |
| Φ(2, 1) = 0, Ψ(2, 1) = π, Θ(2, 1) = π | Φ(2, 2) = π, Ψ(2, 2) = π, Θ(2, 2) = 0 |

Figure 10:
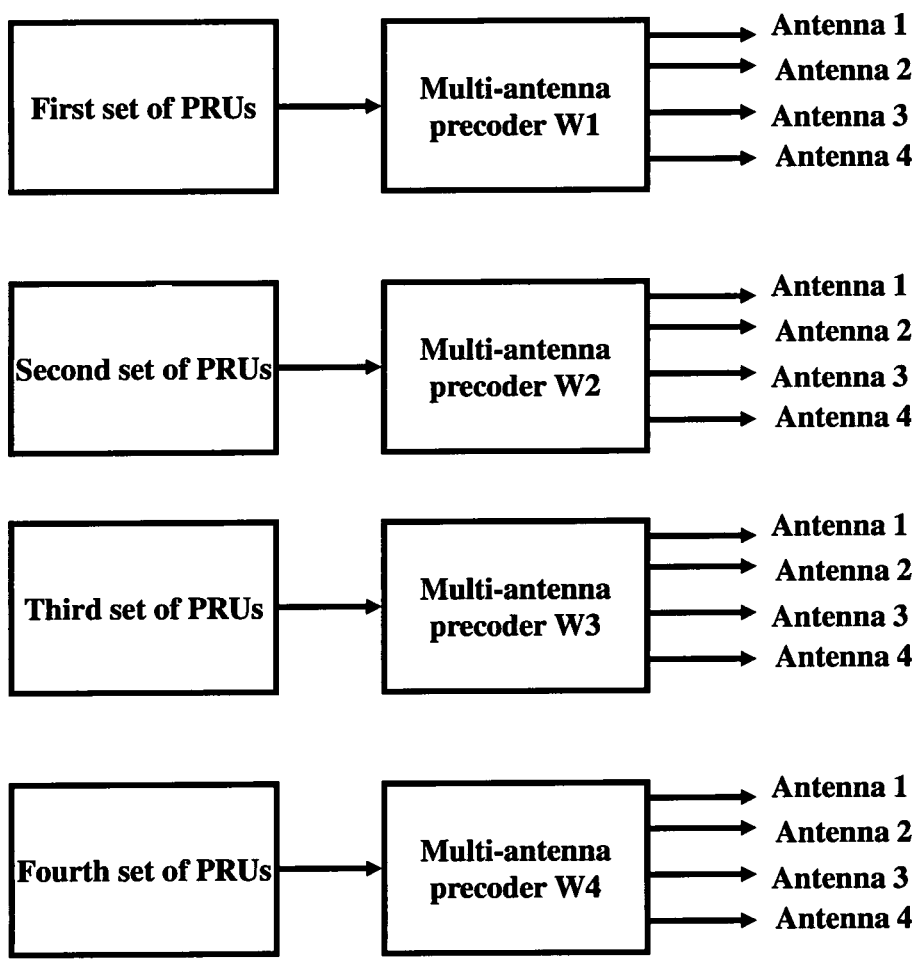
FIG. 10 illustrates the general structure of 4-Tx multi-antenna precoding for 4-Tx antennas, according to embodiments as disclosed herein.

FIG. 10 illustrates the general structure of 4-Tx multi-antenna precoding for 4-Tx antennas.

The above mentioned scheme with 2-antenna precoder may be represented in a more general form as $$y = \begin{bmatrix} w_1(p, q) e^{j\Phi_1(p,q)} \\ w_2(p, q) e^{j\Phi_2(p,q)} \end{bmatrix} s_k \begin{matrix} \xrightarrow{Ant1} \\ \xrightarrow{Ant2} \end{matrix}$$

Where $s_k$ denotes the data/pilot transmitted on the $k^{th}$ subcarrier contained in the (p,q)th slot, $w_j(p, q)$, $\Phi_j(p, q)$, j=1,2 are the amplitude variation, phase rotation applied in the (p,q)th slot. The rows of the vector y will be transmitted simultaneously from antennas 1 and 2, respectively. In this scheme, the 2D amplitude and phase values can be kept constant during the slot and they may take new values in different slots, which span both time and frequency dimensions.

Figure 11:
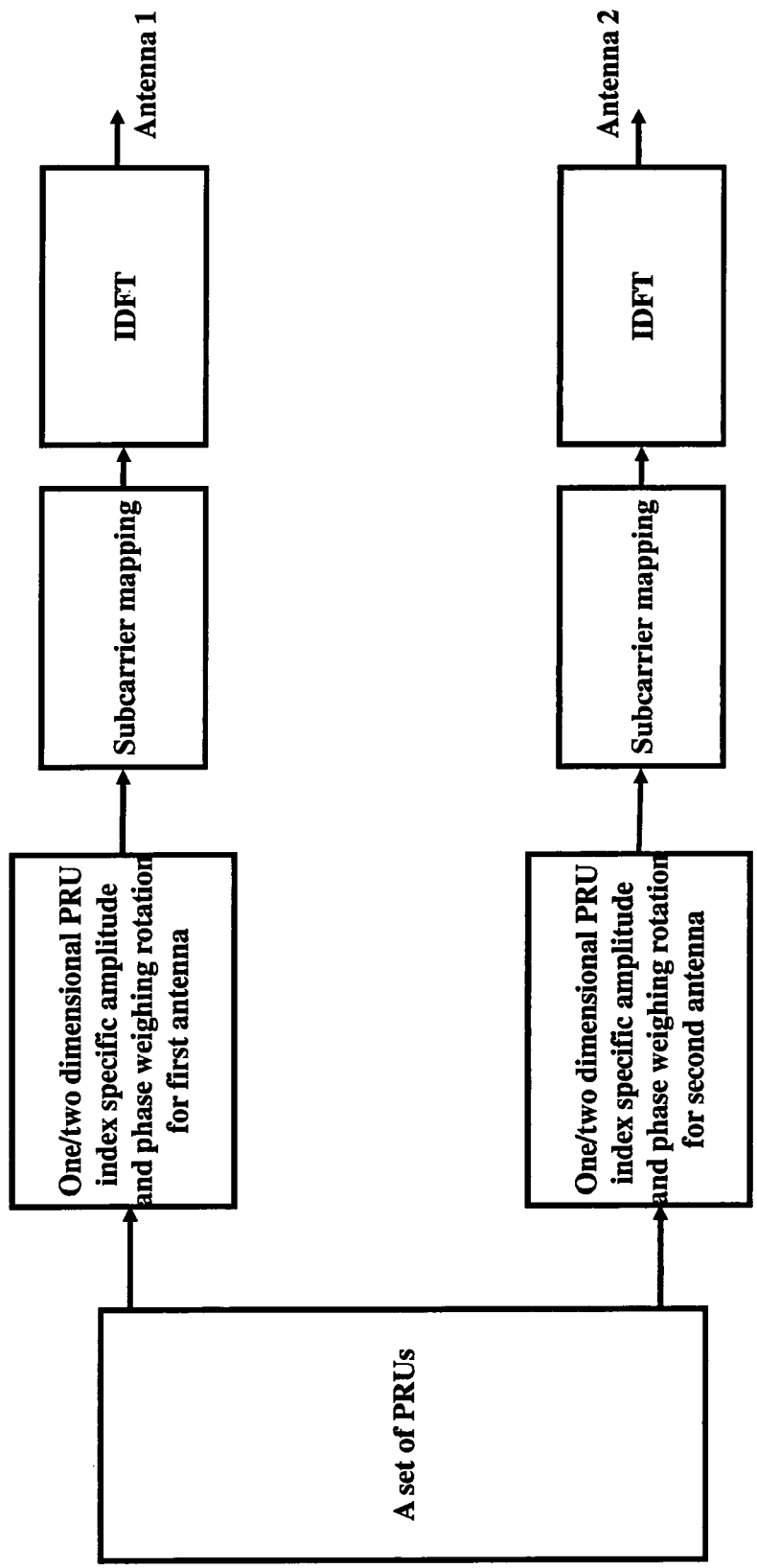
FIG. 11 depicts the general structure of 2D-amplitude and phase varying precoder for 2-Tx antennas, according to embodiments as disclosed herein.

In this scheme, the amplitude weights $w_j$ (p,q) and slot dependent phase values $\Phi_j(p)$ and $\Phi_j(q)$ can be jointly chosen such that the total diversity benefit is maximized under all channel conditions including correlated, uncorrelated, and Rician channels. FIG. 11 illustrates the general structure of 2D-amplitude and phase varying precoder for 2-Tx antennas.

In an embodiment, the amplitude weights on both antennas are kept to unity and a constant phase offset is applied on the second antenna with respect to the first antenna, i.e., $w_1(p, q)=1$, $w_2(p, q)=1$ which results in 1D/2D POD scheme.

The amplitude weights are constrained to take two values from the set $w_j(p, q) \in [1,0]$. Further, the phase weight on one of the antenna can be set to zero value and a slot dependent phase-offset can be applied on the second antenna.

For two antenna case, the amplitude and phase weights can be chosen from the following set either deterministically or randomly in each slot. The precoding vector W(p,q) can be chosen from the following set:

$$S \in \begin{bmatrix} 1 \\ 0 \end{bmatrix}, \begin{bmatrix} 0 \\ 1 \end{bmatrix}, \begin{bmatrix} 1 \\ e^{j\theta(m)} \end{bmatrix},$$

Where θ(m) may take any phase value between 0 and 2π including those values.

In an alternative embodiment, $$S \in \left\{\begin{bmatrix}1\\0\end{bmatrix}, \begin{bmatrix}0\\1\end{bmatrix}, \begin{bmatrix}1\\e^{j2\pi\frac{(l-1)}{R}}\end{bmatrix}\right\}, \quad l = 1, 2, \ldots, R$$

Where R is an integer. As an example, amplitude and phase weights of the following set can be used if the number of assigned slots is 4.

$$S \in \left\{\begin{bmatrix}1\\0\end{bmatrix}, \begin{bmatrix}0\\1\end{bmatrix}, \begin{bmatrix}1\\1\end{bmatrix}, \begin{bmatrix}1\\-1\end{bmatrix}\right\} \text{ or } S \in \left\{\begin{bmatrix}1\\0\end{bmatrix}, \begin{bmatrix}0\\1\end{bmatrix}, \begin{bmatrix}1\\e^{j\Theta}\end{bmatrix}, \begin{bmatrix}1\\e^{-j\Theta}\end{bmatrix}\right\}$$

where $\Theta$ is an angle between 0 and $2\pi$.

In another embodiment, the phase values are set to zero on both antennas, and only 2D or 1D amplitude weights can be used. The vector set in that case is given by:

$$S \in \left\{\begin{bmatrix}1\\0\end{bmatrix}, \begin{bmatrix}0\\1\end{bmatrix}\right\}$$

A vector from this set is chosen for each slot either deterministically or randomly. In this case, the scheme becomes 2D/1D slot based antenna switching in frequency or time or a combination of both. An example of 2D-allocation is shown in Table 8.

TABLE 8

|   | q  | q + 1 | Q + 2 | q + 3 |
|---|----|-------|-------|-------|
| p | W1 | W2    | W1    | W2    |
| p + 1 | W2 | W1 | W2 | W1 |
| p + 2 | W1 | W2 | W1 | W2 |
| p + 3 | W2 | W1 | W2 | W1 |

The precoder takes following values:

$$W1 = \begin{bmatrix}1\\0\end{bmatrix}, \quad W2 = \begin{bmatrix}0\\1\end{bmatrix}$$

As shown in Table-8, W1 and W2 are allocated alternatively in time/frequency directions. The same pattern can be repeated when there are more time/frequency slots.

In general, the phase and amplitude values in frequency slots may be chosen from a predefined code book with arbitrary entries.

In another embodiment described herein, the data and/or pilots in a given slot are switched between different antennas either in time, frequency. For example, as shown in Table 9, data and/or pilots in frequency slot-1 are transmitted through antenna-1 and a second frequency slot is sent on antenna-2.

TABLE 9

Slot(1, 1) Transmitted on Antenna-1
Slot(2, 1) Transmitted on Antenna-2

Alternatively, slot wise antenna switching in time can be implemented as shown in Table 10.

TABLE 10

| Slot(1, 1) on Antenna-1 | Slot(1, 2) on Antanna-2 |
|---|---|

Figure 12:
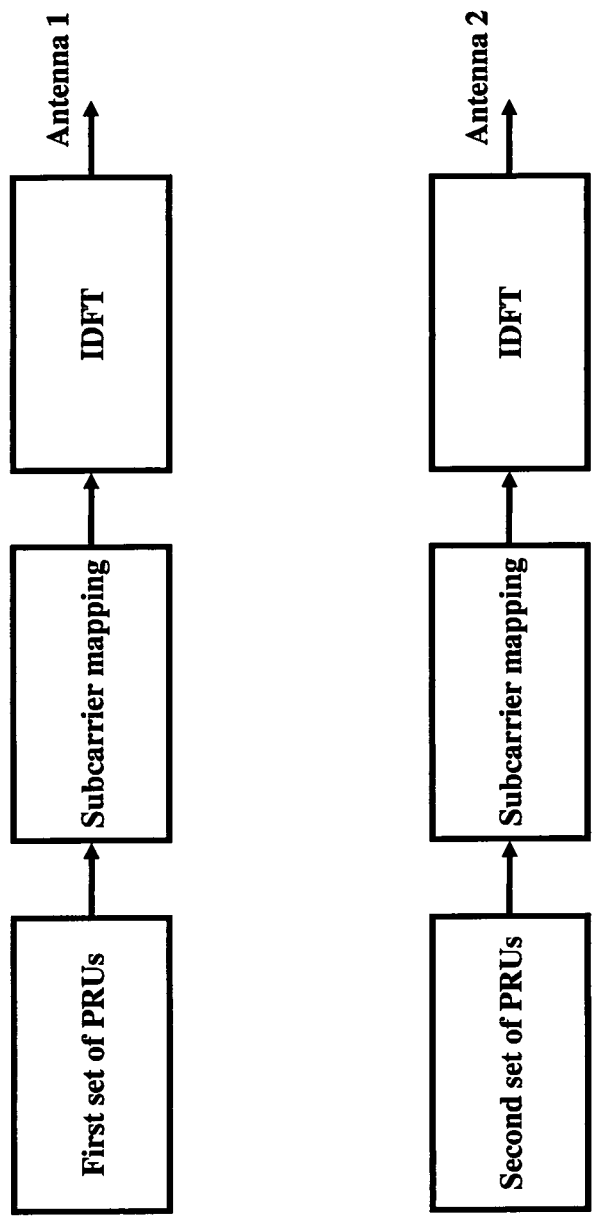
FIG. 12 depicts a 1-dimensional PRU specific antenna switching scheme, according to embodiments as disclosed herein.

FIG. 12 shows a 1-dimensional PRU specific antenna switching scheme. In FIG. 12, antenna switching is applied for two antennas. In an embodiment, the first and second set of PRUs span the same time interval but they are distinct PRU sets in frequency. This scheme uses block wise antenna switching in frequency. In another embodiment, the first and second PRU sets may span different time slots.

More generally, the transmission scheme for 4-Tx antenna case is given by:

$$y = \begin{bmatrix} w_1(p,q)e^{j\Phi_1(p,q)} \\ w_2(p,q)e^{j\Phi_2(p,q)} \\ w_3(p,q)e^{j\Phi_3(p,q)} \\ w_4(p,q)e^{j\Phi_4(p,q)} \end{bmatrix} s_k$$

Where different combination of amplitude and phase weights can be applied in each slot and the rows of the vector are transmitted from 4-antennas.

In an embodiment, the phase on the first antenna can be kept to zero. The amplitude and phase weights can be chosen from the following set:

$$S_1 \in \left\{\begin{bmatrix}1\\0\\0\\0\end{bmatrix}, \begin{bmatrix}0\\1\\0\\0\end{bmatrix}, \begin{bmatrix}0\\0\\1\\0\end{bmatrix}, \begin{bmatrix}0\\0\\0\\1\end{bmatrix}, \begin{bmatrix}1\\e^{j\theta(1)}\\e^{j\theta(2)}\\e^{j\theta(3)}\end{bmatrix}\right\}$$

Where the phase angles can take any value between 0 and $2\pi$. In an embodiment, the phase angles may be chosen such that the phase dependent vectors form a Hadamard matrix or a generalized DFT matrix.

A Hadamard matrix is a square matrix whose entries are either +1 or −1 and whose rows are mutually orthogonal. In geometric terms, this means that every two different rows in a Hadamard matrix represent two perpendicular vectors, while in combinatorial terms, it means that every two different rows have matching entries in exactly half of their columns and mismatched entries in the remaining columns.

The amplitude and phase weighing technique can be generalized to arbitrary number of antennas.

The 2D-precoder to be used in a given slot may be obtained from a predefined code book. The precoder for (p,q)th slot can be obtained from Table-9 where W1, W2, W3, W4 may take the following sets:

$$W_1 = \begin{bmatrix}1\\0\\0\\0\end{bmatrix}, W_2 = \begin{bmatrix}0\\1\\0\\0\end{bmatrix}, W_3 = \begin{bmatrix}0\\0\\1\\0\end{bmatrix}, W_4 = \begin{bmatrix}0\\0\\0\\1\end{bmatrix}, \text{ or}$$

$$W_1 = \begin{bmatrix}1\\1\\1\\1\end{bmatrix}, W_2 = \begin{bmatrix}1\\-1\\1\\-1\end{bmatrix}, W_3 = \begin{bmatrix}1\\1\\-1\\-1\end{bmatrix}, W_4 = \begin{bmatrix}1\\-1\\-1\\1\end{bmatrix}$$

In an embodiment, W1,W2,W3,W4 can be arranged in any order.

The proposed method can be utilized with common or dedicated pilots. Common pilots or shared pilots are defined as pilots, which are common to all users or a group of users. When the system uses shared pilots, the subcarriers in a given PRU are shared by a group of users while the pilot tones are common to the group. In this case, all the users which use the shared pilots may use the same multiple antenna precoder for both data and pilot tones in that PRU.

In some systems, the data tones may be precoded using a PRU specific precoder while the pilot tones may not use precoding. In that case, the system may train each antenna using distinct pilots which are specific to that antenna.

Dedicated pilots are defined as user specific pilots. In case of dedicated pilot transmission, the pilots can be interspersed along with data and they are transmitted from both antennas with slot specific 2D-amplitide variation and/or 2D-phase rotation. Pilot structures that are designed for precoded or single antenna systems can be used with this scheme. The receiver can perform channel estimation in each PRU in a single (virtual) antenna mode and estimates a single equivalent channel per receiver antenna from the $N_T$ transmit antennas. Therefore, this scheme has a lower implementation complexity. Demodulation and decoding can be implemented using conventional techniques.

In the following, a technique which uses either a physical PRU index in frequency axis or logical PRU index indices to determine the precoder for a given PRU has been disclosed.

In an embodiment herein, the available bandwidth is divided into a number of frequency partitions. A frequency partition $FP_i$, i=0, 1, 2, . . . , $N_p$ consists of a total of $N_{PRU}$ PRUs which may include localized and/or distributed resource units. The frequency spacing between distributed units is arbitrary.

If a given frequency partition contains distributed PRUs, and if precoder selection is done based on physical subcarrier index or physical PRU index, the allocated precoder sequence does not follow the desired periodic pattern. Such as scheme looses diversity gain in channels with low frequency selectivity. Moreover, if a given frequency partition contains a mix of sub-bands and mini-bands, it may not be possible to define the precoders for both sub-bands and mini-bands using PRU index as the basis.

In an embodiment herein, each PRU in a given frequency partition is assigned a logically contiguous PRU index "i" which ranges from 0, 1, 2, . . . , $N_{PRU}$-1. The index "i" is assigned in the increasing order starting from first to last PRU in that frequency partition. Note that indexing is done before subcarrier per mutation if DRUs are present in that frequency partitions. In some embodiments the PRU index "i" may correspond to physically contiguous PRUs. The precoder may be defined for each PRU in that partition based on the logical PRU index.

In each frequency partition, the indexing may be done for subbands and mini-band separately. In other words, all the subbands and minibands are treated as separate sub partitions within a frequency partitions for the purpose of precoder allocation. In an alternative implementation, the subbands and a first set of minibands are utilized localized resource allocations and a second set of mini-bands are allocated for subcarrier permuted distributed allocations. In that case, the frequency partition consists of three separate sub-partitions.

If subbands are used in that frequency partition, each subband is allocated an index $i_{subband}$ which ranges from 0, 1, 2, . . . , $N_{subbands}$-1. $N_{subbands}$ is the total number of subbands in the frequency sub partition.

If the first set of mini-band are utilized for localized allocations, in that frequency partition, each miniband in that first set is allocated an index $i_{miniband}$ 1 which ranges from 0, 1, 2, . . . , $N_{miniband\ 1}$-1. $N_{miniband}$ 1 is the total number of minibands in the frequency sub partition.

If a second set of mini-band are utilized for the purpose of subcarrier permuted allocations, each miniband in that second set is allocated an index $i_{miniband\ 2}$ which ranges from 0, 1, 2, . . . , $N_{miniband\ 2}$ 1. $N_{miniband\ 2}$ is the total number of minibands in second set in that frequency sub partition In some implementations, the first and seconds sets of minibands can be combined and they can be assigned an index $i_{miniband}$ which ranges from 0, 1, 2, . . . , $N_{miniband}$-1. $N_{miniband}$ is the total number of mini-bands in the frequency sub partition.

In each sub-partition, precoder allocation can be defined using a pre-defined method. This type of sub-partition specific dependent indexing makes precoder allocation more efficient especially if system contains a mixture of subbands and mini-bands. For subbands, The precoder is kept constant for all N1 successive PRUs contained in each subband. Preferred values for N1 are 3, or 4, or 5. For mini-bands, the precoder is kept constant for N2 successive PRUs contained in each mini-band. Preferred values for N2 are 1, or 2.

In each sub partition, a precoding matrix W of size Nt×1 which is applied in each subband or miniband with frequency index "i", and sub-frame index "v", is determined from a code book C as: W=C(m).

For 1D-precoding "m" is defined as: m=mod [u,M]+1. For 2-D precoding "m" is defined as: m=mod [(u+v),M]+1, where M is the size of code book C, u=mod(i,M)+1. "v" is the subframe number.

In the above mentioned embodiment, the precoder which is implemented in a PRU depends on index "i" of the subband, or mini-band to which it belongs, and the subframe index "v". In 2D-precoding, the sum of index "i" in frequency and the subframe index "v" are used to decide the precoder which is applied in that PRU. In 1D-precoding, the PRU index "i" in frequency is used to decide the precoder which is applied in that subband or miniband. In an alternative embodiment for 2D precoding, the precoding matrix W may be chosen as: W=C(m)·C(n) where the notation C(m)·C(n) denotes element-wise multiplication of the two matrices/vectors, and m=mod [u,M]+1, n=mod [v,M]+1.

For single stream 2-Tx precoding, the code book may be chosen as:

$$C(1) = \frac{1}{\sqrt{2}}\begin{bmatrix} 1 \\ j \end{bmatrix}, C(2) = \frac{1}{\sqrt{2}}\begin{bmatrix} 1 \\ -j \end{bmatrix}.$$

In an alternative embodiment, for 2-Tx antennas, the entries of the code book C for a typical value of M=8 are given by:

$$C(1) = \frac{1}{\sqrt{2}}\begin{bmatrix} 1 \\ 1 \end{bmatrix}, C(2) = \frac{1}{\sqrt{2}}\begin{bmatrix} 1 \\ -1 \end{bmatrix}, C(3) = \frac{1}{\sqrt{2}}\begin{bmatrix} 1 \\ j \end{bmatrix},$$

$$C(4) = \frac{1}{\sqrt{2}}\begin{bmatrix} 1 \\ -j \end{bmatrix}, C(5) = \frac{1}{\sqrt{2}}\begin{bmatrix} 1 \\ \frac{1+j}{\sqrt{2}} \end{bmatrix}, C(6) = \frac{1}{\sqrt{2}}\begin{bmatrix} 1 \\ \frac{-1-j}{\sqrt{2}} \end{bmatrix},$$

$$C(7) = \frac{1}{\sqrt{2}}\begin{bmatrix} 1 \\ \frac{-1+j}{\sqrt{2}} \end{bmatrix}, C(8) = \frac{1}{\sqrt{2}}\begin{bmatrix} 1 \\ \frac{-1-j}{\sqrt{2}} \end{bmatrix}.$$

For M<8, the code book will be a subset of a bigger set (M=8) in this case. For example, for M=2 first two entries can be considered, and for M=4 first four entries can be considered, and so on. Preferred values for M are 2, 4, 6, 8, respectively, but not limited to these values. The entries of the code book C for M=2 are given by:

$$C1(1) = \begin{bmatrix} 1 \\ 1 \end{bmatrix}, C1(2) = \begin{bmatrix} 1 \\ -1 \end{bmatrix}$$

For 4-Tx antennas, single stream, transmission, the preferred entries of the code book are given by:

$$C(1) = \frac{1}{\sqrt{4}}\begin{bmatrix} 1 \\ 1 \\ 1 \\ -1 \end{bmatrix}, C(2) = \frac{1}{\sqrt{4}}\begin{bmatrix} 1 \\ -1 \\ 1 \\ 1 \end{bmatrix},$$

$$C(3) = \frac{1}{\sqrt{4}}\begin{bmatrix} 1 \\ j \\ -1 \\ 1 \end{bmatrix}, C(4) = \frac{1}{\sqrt{4}}\begin{bmatrix} 1 \\ -j \\ -1 \\ -j \end{bmatrix}$$

In an alternative embodiment the following entries may be chosen for single stream 4-Tx case:

$$C(1) = \frac{1}{\sqrt{4}}\begin{bmatrix} 1 \\ 1 \\ 1 \\ 1 \end{bmatrix}, C(2) = \frac{1}{\sqrt{4}}\begin{bmatrix} 1 \\ -1 \\ 1 \\ -1 \end{bmatrix},$$

$$C(3) = \frac{1}{\sqrt{4}}\begin{bmatrix} 1 \\ 1 \\ -1 \\ -1 \end{bmatrix}, C(4) = \frac{1}{\sqrt{4}}\begin{bmatrix} 1 \\ -1 \\ -1 \\ 1 \end{bmatrix}$$

The elements of code book for 8-Tx case may be chosen as:

$$C(1) = \frac{1}{\sqrt{8}}\begin{bmatrix} 1 \\ e^{j\pi Sin(\theta_l)} \\ e^{j2\pi Sin(\theta_l)} \\ e^{j3\pi Sin(\theta_l)} \\ e^{j4\pi Sin(\theta_l)} \\ e^{j5\pi Sin(\theta_l)} \\ e^{j6\pi Sin(\theta_l)} \\ e^{j7\pi Sin(\theta_l)} \end{bmatrix}$$

where $\theta_l = \left((l-1) + \frac{1}{2}\right)\frac{\pi}{4} - \frac{\pi}{23}$ and $l = 1, 2, \ldots, 16$ In alternative implementation, a precoder W is applied in a PRU with two dimensional indices (p,q) where W(p,q)=W(p) .W(q) where the notation W(p).W(q) denotes element wise multiplication of two vectors/matrices. The notation (p,q) denotes the index of the physical resource unit (PRU) in two dimensional frequency-time planes, where 'p' denotes PRU index along frequency, and 'q' denotes index in time dimension. The index "p" may be a physical PRU index or a logical index.

W(p)=C(m), where m=mod(p,rM)+1 where M is the size of code book

W(q)=C1(n), where n=mod(q,sM1)+1 where M1 is the size of code book C1, where r and s take any value greater than or equal to 1.

In 1D implementation, W(p,q)=W(p)

In an embodiment r and s are equal to 1. In an embodiment, for 2-Tx antennas, the entries of the code book C for a typical value of M=8 are given by:

$$C(1) = \frac{1}{\sqrt{2}}\begin{bmatrix} 1 \\ 1 \end{bmatrix}, C(2) = \frac{1}{\sqrt{2}}\begin{bmatrix} 1 \\ -1 \end{bmatrix}, C(3) = \frac{1}{\sqrt{2}}\begin{bmatrix} 1 \\ j \end{bmatrix},$$

$$C(4) = \frac{1}{\sqrt{2}}\begin{bmatrix} 1 \\ -j \end{bmatrix}, C(5) = \frac{1}{\sqrt{2}}\begin{bmatrix} 1 \\ \frac{1+j}{\sqrt{2}} \end{bmatrix}, C(6) = \frac{1}{\sqrt{2}}\begin{bmatrix} 1 \\ \frac{-1-j}{\sqrt{2}} \end{bmatrix},$$

$$C(7) = \frac{1}{\sqrt{2}}\begin{bmatrix} 1 \\ \frac{-1+j}{\sqrt{2}} \end{bmatrix}, C(8) = \frac{1}{\sqrt{2}}\begin{bmatrix} 1 \\ \frac{-1-j}{\sqrt{2}} \end{bmatrix}.$$

For M<8, the code book will be a subset of a bigger set (M=8) in this case. For example, for M=2 first two entries can be considered, and for M=4 first four entries can be considered, and so on. Preferred values for M are 2, 4, 6, 8, respectively, but not limited to these values. The entries of the code book C1 for M1=2 are given by:

$$C1(1) = \begin{bmatrix} 1 \\ 1 \end{bmatrix}, C1(2) = \begin{bmatrix} 1 \\ -1 \end{bmatrix}$$

The entries of the code book C for M=4 are given by:

$$C(1) = \frac{1}{\sqrt{4}}\begin{bmatrix} 1 \\ 1 \\ 1 \\ 1 \end{bmatrix}, C(2) = \frac{1}{\sqrt{4}}\begin{bmatrix} 1 \\ -1 \\ 1 \\ -1 \end{bmatrix},$$

$$C(3) = \frac{1}{\sqrt{4}}\begin{bmatrix} 1 \\ 1 \\ -1 \\ -1 \end{bmatrix}, C(4) = \frac{1}{\sqrt{4}}\begin{bmatrix} 1 \\ -1 \\ -1 \\ 1 \end{bmatrix}$$

The entries of the code book C1 for M1=4 are given by:

$$C1(1) = \frac{1}{\sqrt{4}}\begin{bmatrix} 1 \\ 1 \\ 1 \\ 1 \end{bmatrix}, C1(2) = \frac{1}{\sqrt{4}}\begin{bmatrix} 1 \\ 1 \\ -1 \\ -1 \end{bmatrix},$$

$$C1(3) = \frac{1}{\sqrt{4}}\begin{bmatrix} 1 \\ -1 \\ 1 \\ -1 \end{bmatrix}, C1(4) = \frac{1}{\sqrt{4}}\begin{bmatrix} 1 \\ -1 \\ -1 \\ 1 \end{bmatrix}$$

In an embodiment, the elements of the code book C can be arranged in any order. More generally, the code book C1 can be obtained from C by using a permutated version of the code book C. The permutation sequence can be obtained as follows.

Take the code book indices of C i.e., 1, 2, . . . M and write them in binary form after subtracting 1 from each index For M=4, the indices are represented as (00), 01), (10), (11).

Rewrite the indices in bit reversal order i.e. for M=4, now we have (00), (10),(01),(11), which becomes 0, 2, 1, 3. Add 1 to entry. The permutation sequence now becomes 1, 3, 2, 4. Use this permutation sequence to permute the code book C.

The elements of code book C1 are given by C(1), C(3), C(2), C4). This technique can be generalized applied to any code book C to obtain the permuted code book C1.

The entries of the code book C for M=8 are given by:

$$C(1) = \frac{1}{\sqrt{8}}\begin{bmatrix}1\\1\\1\\1\\1\\1\\1\\1\end{bmatrix}, C(2) = \frac{1}{\sqrt{8}}\begin{bmatrix}1\\-1\\1\\-1\\1\\-1\\1\\-1\end{bmatrix}, C(3) = \frac{1}{\sqrt{8}}\begin{bmatrix}1\\1\\-1\\-1\\1\\1\\-1\\-1\end{bmatrix},$$

$$C(4) = \frac{1}{\sqrt{8}}\begin{bmatrix}1\\-1\\-1\\1\\1\\-1\\-1\\1\end{bmatrix}, C(5) = \frac{1}{\sqrt{8}}\begin{bmatrix}1\\1\\1\\1\\-1\\-1\\-1\\-1\end{bmatrix}, C(6) = \frac{1}{\sqrt{8}}\begin{bmatrix}1\\-1\\1\\-1\\-1\\1\\-1\\1\end{bmatrix},$$

$$C(7) = \frac{1}{\sqrt{8}}\begin{bmatrix}1\\1\\-1\\-1\\-1\\-1\\1\\1\end{bmatrix}, C(8) = \frac{1}{\sqrt{8}}\begin{bmatrix}1\\-1\\-1\\1\\-1\\1\\1\\-1\end{bmatrix}$$

In an embodiment, the elements of the code book C can be arranged in any order. The entries of the code book C1 for M1=8 are given by:

$$C1(1) = \frac{1}{\sqrt{8}}\begin{bmatrix}1\\1\\1\\1\\1\\1\\1\\1\end{bmatrix}, C1(2) = \frac{1}{\sqrt{8}}\begin{bmatrix}1\\1\\1\\1\\-1\\-1\\-1\\-1\end{bmatrix}, C1(3) = \frac{1}{\sqrt{8}}\begin{bmatrix}1\\1\\-1\\-1\\1\\1\\-1\\-1\end{bmatrix},$$

$$C1(4) = \frac{1}{\sqrt{8}}\begin{bmatrix}1\\1\\-1\\-1\\-1\\-1\\1\\1\end{bmatrix}, C1(5) = \frac{1}{\sqrt{8}}\begin{bmatrix}1\\-1\\1\\-1\\1\\-1\\1\\-1\end{bmatrix}, C1(6) = \frac{1}{\sqrt{8}}\begin{bmatrix}1\\-1\\1\\-1\\-1\\1\\-1\\1\end{bmatrix},$$

$$C1(7) = \frac{1}{\sqrt{8}}\begin{bmatrix}1\\-1\\-1\\1\\1\\-1\\-1\\1\end{bmatrix}, C1(8) = \frac{1}{\sqrt{8}}\begin{bmatrix}1\\-1\\-1\\1\\-1\\1\\1\\-1\end{bmatrix}$$

Figure 13:
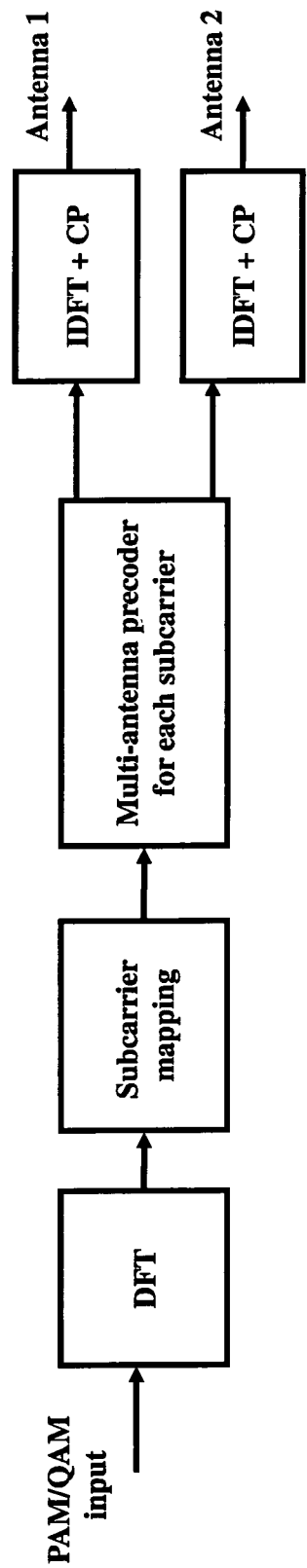
FIG. 13 illustrates a general DFT-S-OFDMA structure with precoding, according to embodiments as disclosed herein.

FIG. 13 illustrates a general DFT-S-OFDMA structure with precoding. 2-transmit antennas are shown for illustration. The multi-antenna precoder is applied for each subcarrier after DFT precoding. Open loop (OL) precoding schemes such as 1D-POD in time or antenna switching in frequency or a combination of them can be employed to obtain transmit diversity gain.

Figure 14:
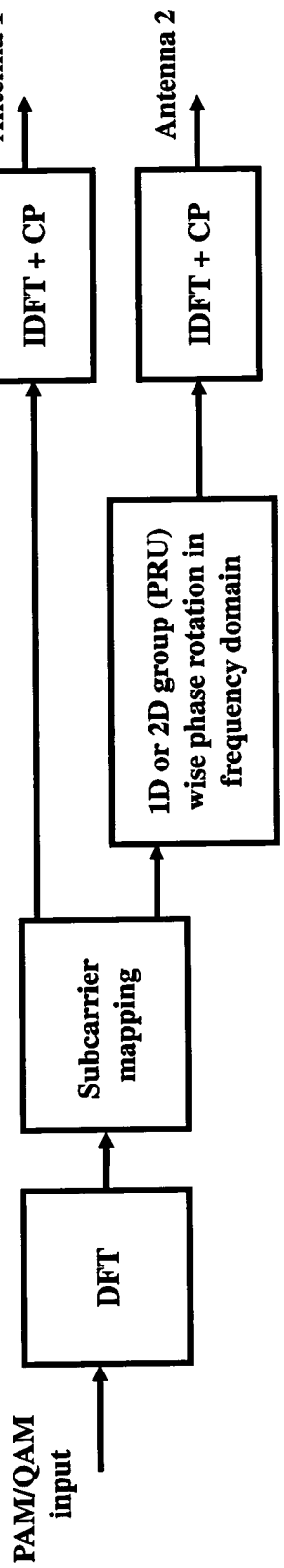
FIG. 14 illustrates a general DFT-S-OFDMA structure which uses an IDFT for each antenna, according to embodiments as disclosed herein.

FIG. 14 illustrates a general DFT-S-OFDMA structure which uses an IDFT for each antenna. The frequency domain signal is fed to the IDFT module on the first antenna. The same signal is multiplied with a PRU specific phase weight and the phase weighed signal is fed to another IDFT module. The output is transmitted on the second antenna. In 1D-POD implementation, the phase may take different values in different PRUs. However, in some cases, it is preferable to keep the phase on second antenna can be kept constant over two successive PRUs. In that case, the precoder values may change every two PRUs.

Figure 15:
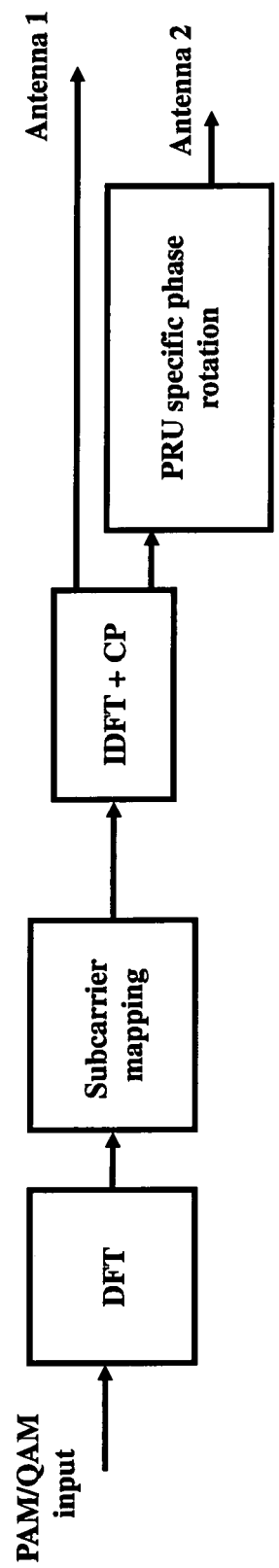
FIG. 15 illustrates the DFT-S-OFDMA structure which uses 1D-POD using a single IDFT module, according to embodiments as disclosed herein.

FIG. 15 illustrates the DFT-S-OFDMA structure which uses 1D-POD using a single IDFT module. The IDFT output is transmitted on first antenna. This signal is multiplied with a PRU specific phase rotation and it is transmitted on the second antenna. When the system has more than 2-Tx antennas, an antenna specific phase rotation is applied on the signal transmitted on each antenna. The phase rotation can be done in time.

Figure 16:
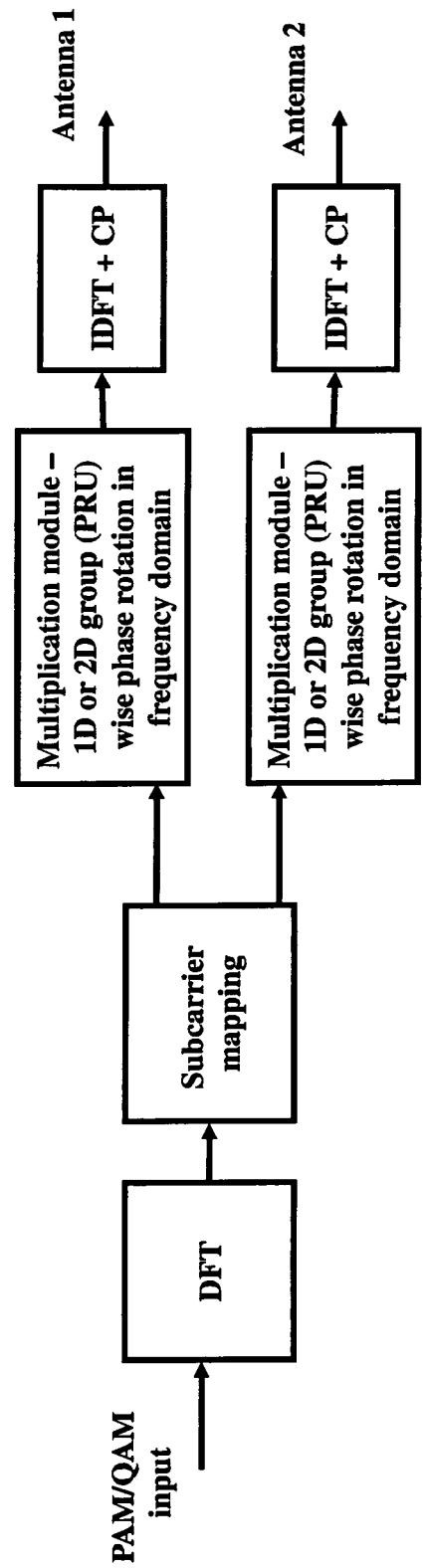
FIG. 16 illustrates a more general form of precoding, according to embodiments as disclosed herein.

FIG. 16 illustrates a more general form of precoding where the signal, which is transmitted on each antenna is multiplied with a PRU specific complex weight whose magnitude and phase depends on the antenna on which the signal is transmitted.

Figure 17:
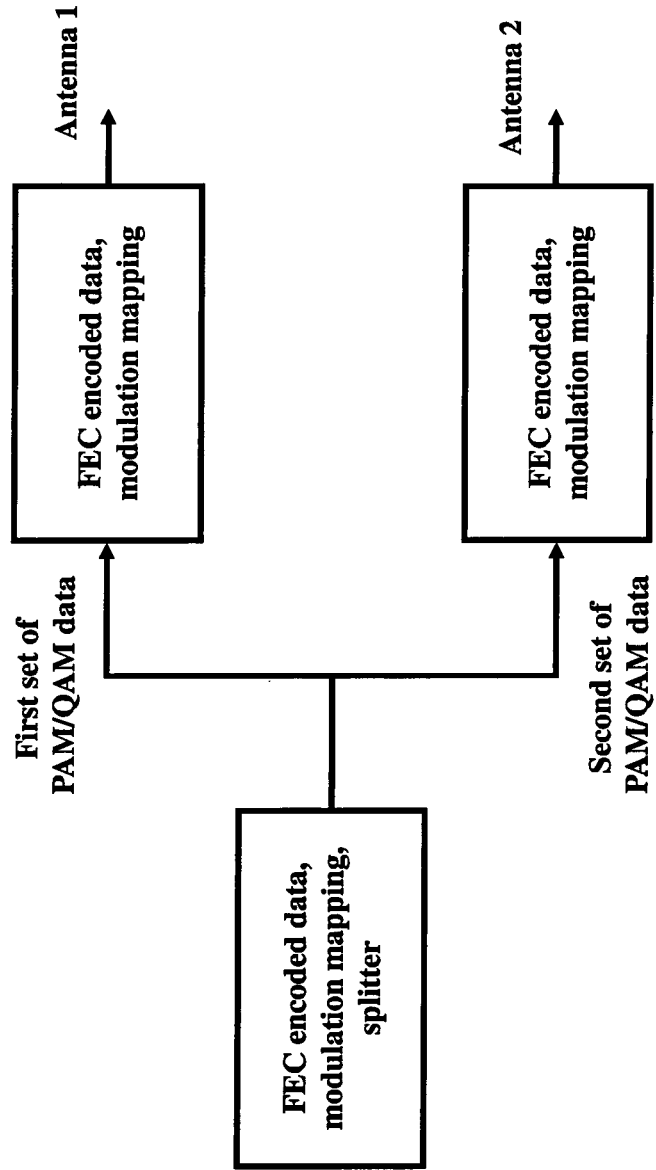
FIG. 17 illustrates scheme for 2-Tx antennas, according to embodiments as disclosed herein.

FIG. 17 illustrates scheme for 2-Tx antennas in which the FEC encoded modulation data is split into Nt=2 sets where the first set contains first half of data sequence and the second set contains the second half of data sequence. Each data set is transmitted using DFT-S-OFDMA transmitter and transmitted on distinct antenna. The first set of data may span first N contiguous subcarriers and second set of data may span second N contiguous set subcarriers where first and second sets may span the same time duration. Moreover, the first set and second set may be contiguous or distributed in frequency.

In an alternative embodiment, the first set of data may span first N contiguous subcarriers in the first time slot and set of data may span second N contiguous subcarriers in the second time slot. The first and second subcarriers may span the same frequency duration or they may belong to distinct subcarrier groups.

Figure 18:
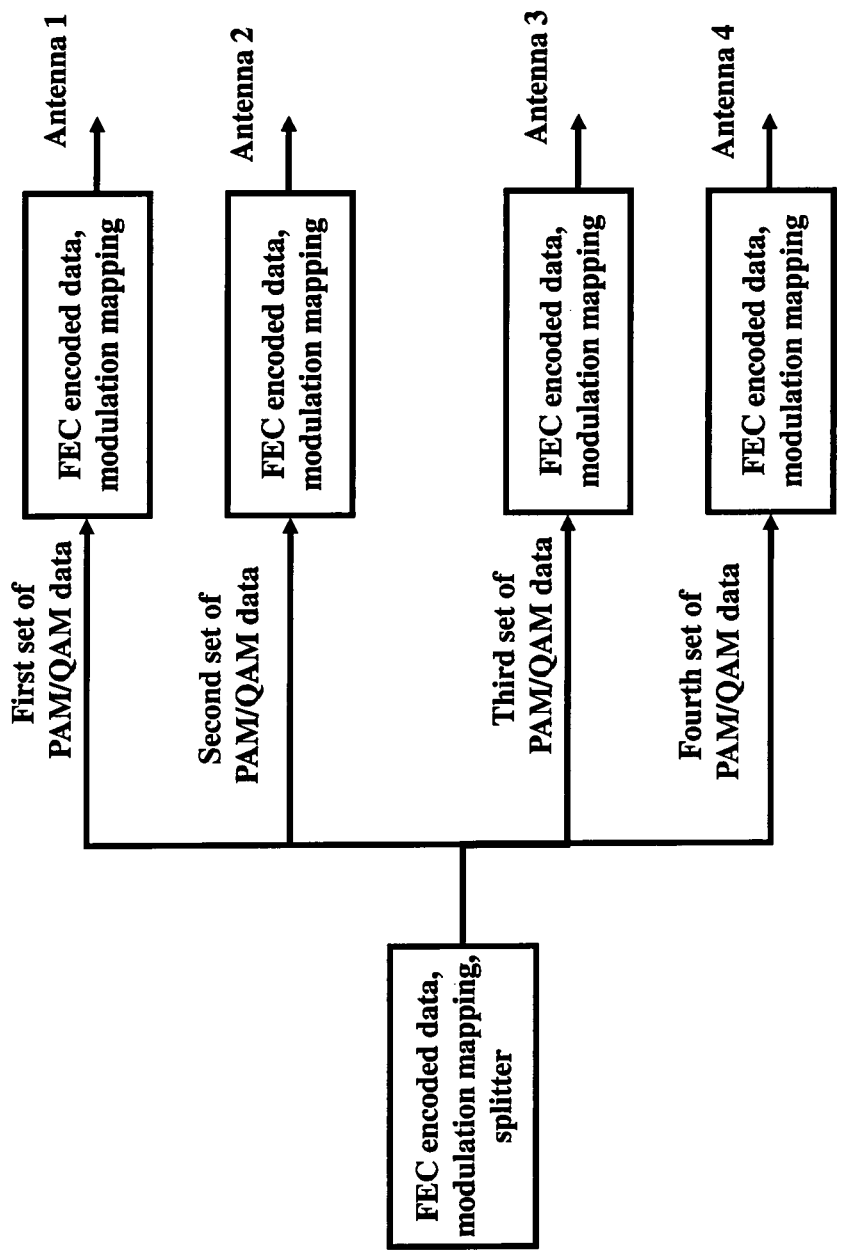
FIG. 18 illustrates the transmitter structure for Nt=4, according to embodiments as disclosed herein.

FIG. 18 illustrates the transmitter structure for Nt=4. Each set of subcarriers are contiguous in frequency. The first four sets of subcarriers may be contiguous or distributed in frequency.

In all the above embodiments, since the multiple data sets are encoded using a common channel code, and also since each set undergoes a different channel state, the receiver benefits from transmit diversity after channel decoding.

Figure 19:
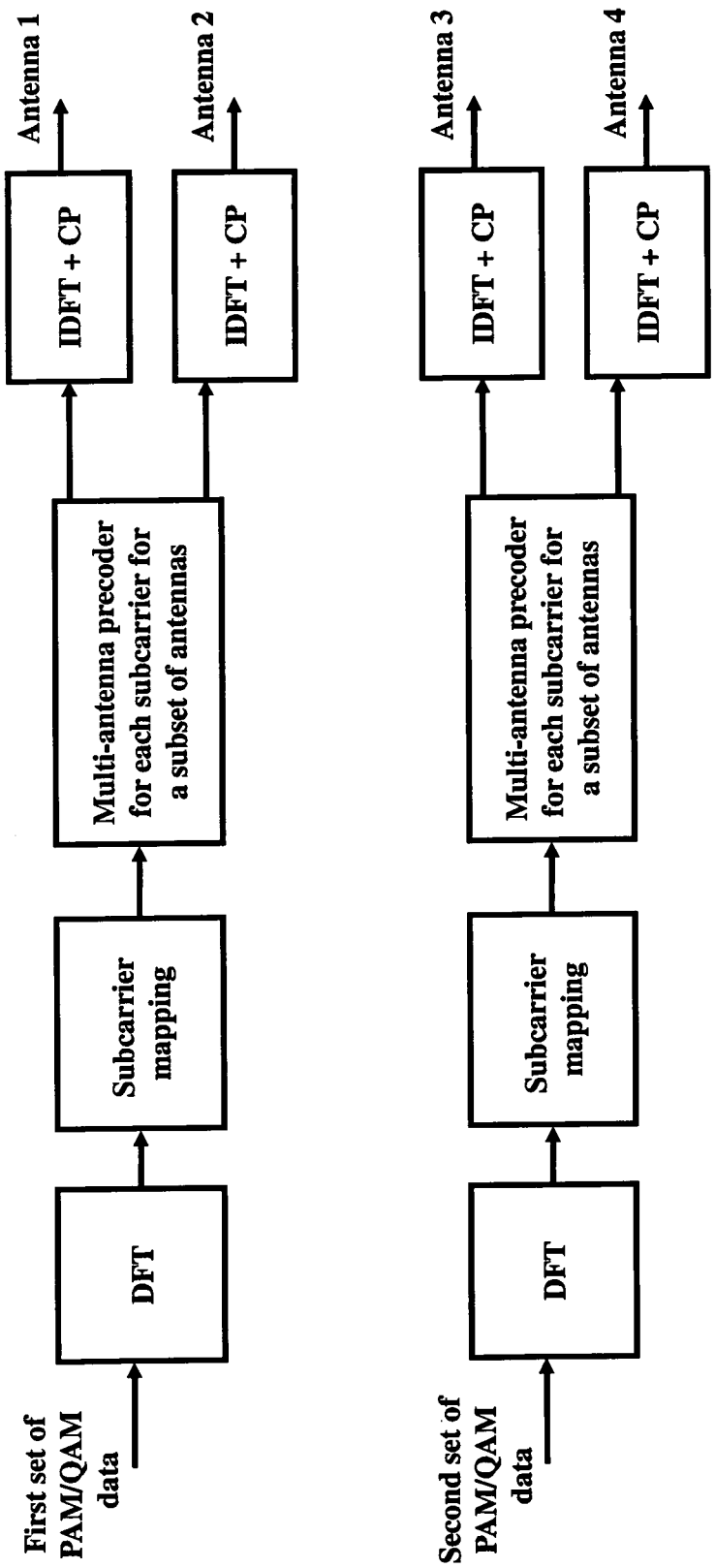
FIG. 19 depicts DFT-S-OFDMA with precoding-1, according to embodiments as disclosed herein.

In another embodiment shown in FIG. 19, the FEC encoded data is split into multiple sets where each PAM/QAM data of each set is modulated on to contiguous subcarriers. Each set is encoded using a DFT-S-OFDMA transmitter and the signal is precoded and the precoded signal is transmitted using a subset of antennas. When the subset size is two, the precoder may be POD type precoder of form:

$$W \in \begin{bmatrix} 1 \\ e^{j\theta(1)} \end{bmatrix}$$

which is kept constant for all subcarriers with in PRU. The phase weights can be varied in time every "n" PRUs where n can be any integer.

Figure 20:
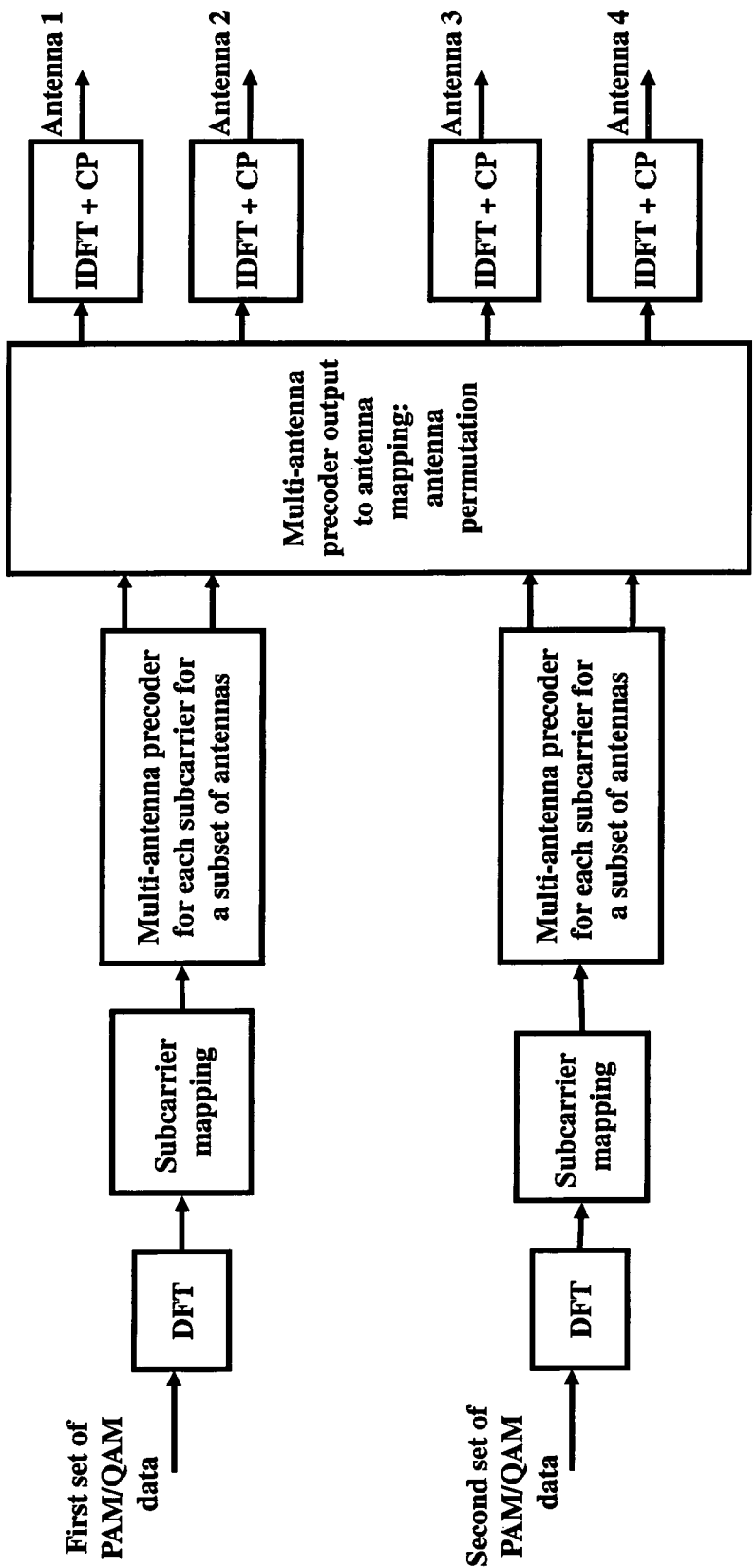
FIG. 20 depicts DFT-S-OFDMA with precoding and antenna permutation, according to embodiments as disclosed herein.

In an embodiment, shown in FIG. 20, the precoder output to antenna mapping can be changed in time or frequency to obtain additional diversity benefit.

In all the above embodiments, the OFDM symbols which carry the data and pilot signals are transmitted using the same precoder. The precoder is kept constant for either a single time slot, pair of slots or more. Keeping the precoders constant in time is useful for enhancing the channel estimation and interference covariance estimation.

For transmission schemes described in FIG. 17-20, each data set is equalized using a DFT-S-OFDMA receiver and the equalized bit level soft decisions are multiplexed into a single stream for channel decoding.

Figure 21:
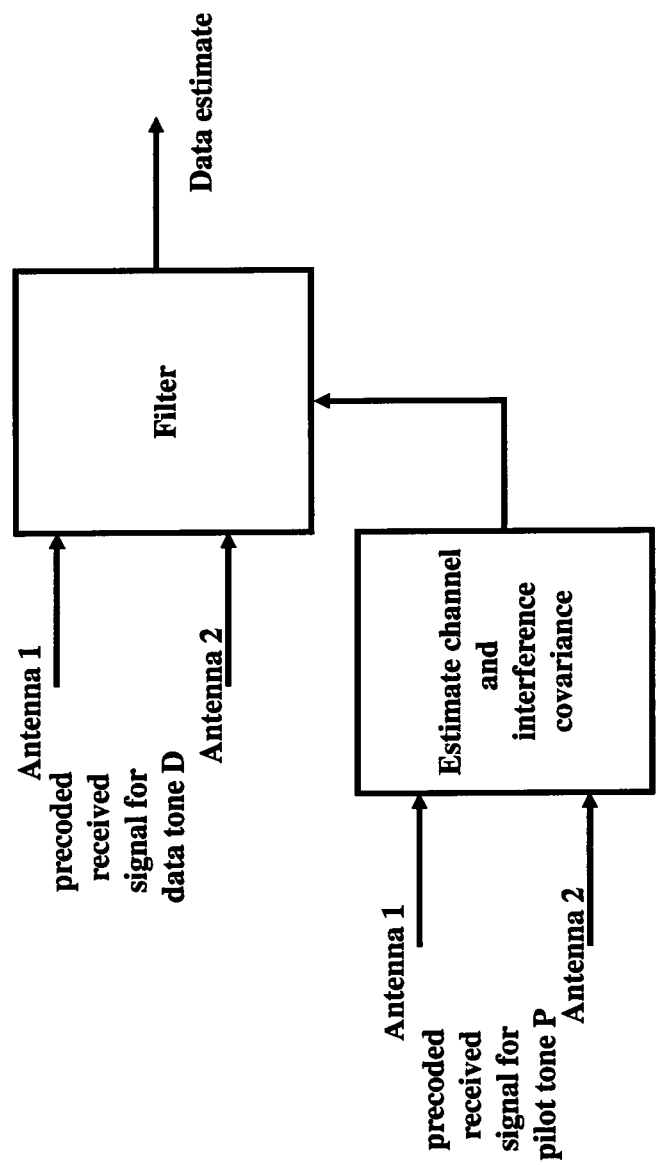
FIG. 21 illustrates the baseband portion of the OFDM receiver, according to embodiments as disclosed herein.

FIG. 21 illustrates the baseband portion of the OFDM receiver. Precoded pilot tones are used to estimate the channel state information and interference covariance estimation. A filter is used to demodulate the precoded data tones. The filter weights are computed using the estimated channel and estimated interference covariance. In typical implementations, the receiver processes each PRU independently.

Figure 22:
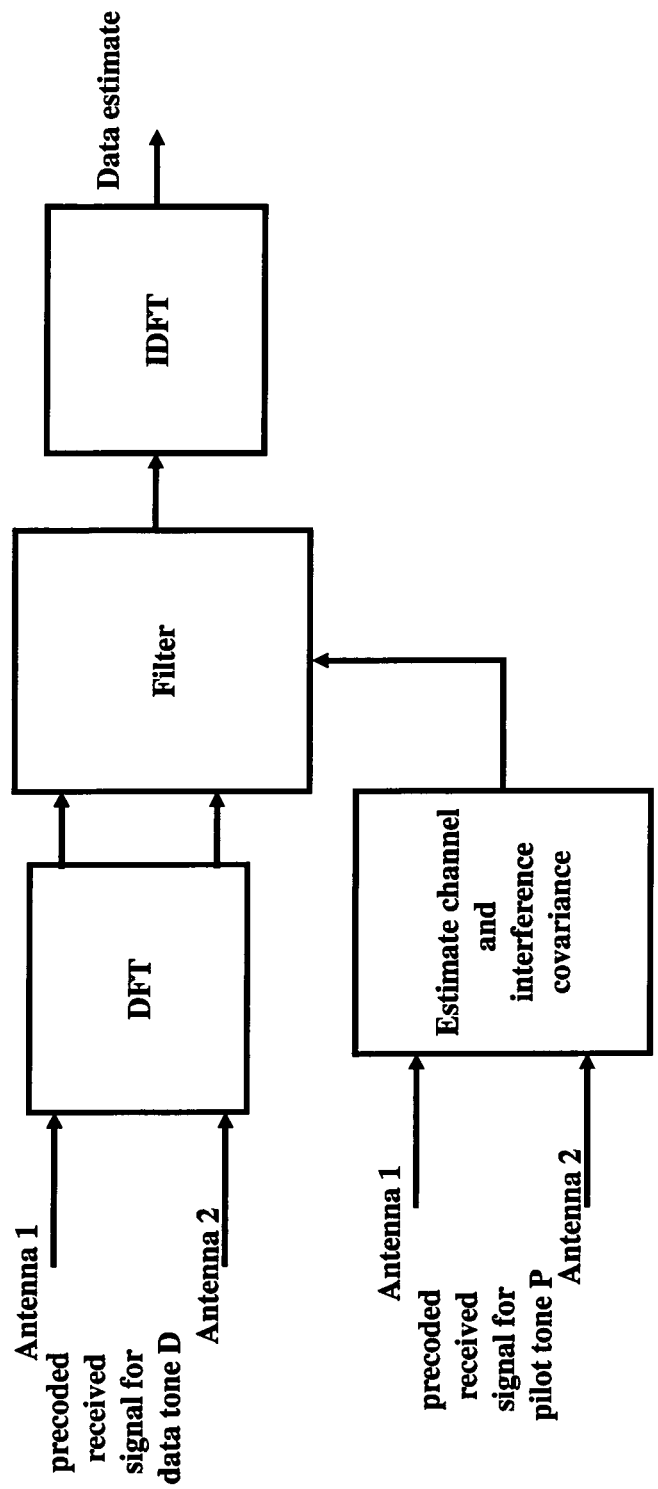
FIG. 22 illustrates the baseband portion of the DFT-S-OFDMA receiver, according to embodiments as disclosed herein.

FIG. 22 illustrates the baseband portion of the DFT-S-OFDMA receiver. Precoded pilot tones are used to estimate the channel state information and interference covariance estimation. A filter is used to demodulate the precoded data tones. The filter weights are computed using the estimated channel and estimated noise-plus-interference covariance. In typical implementations, the receiver processes each PRU independently.

Figure 23:
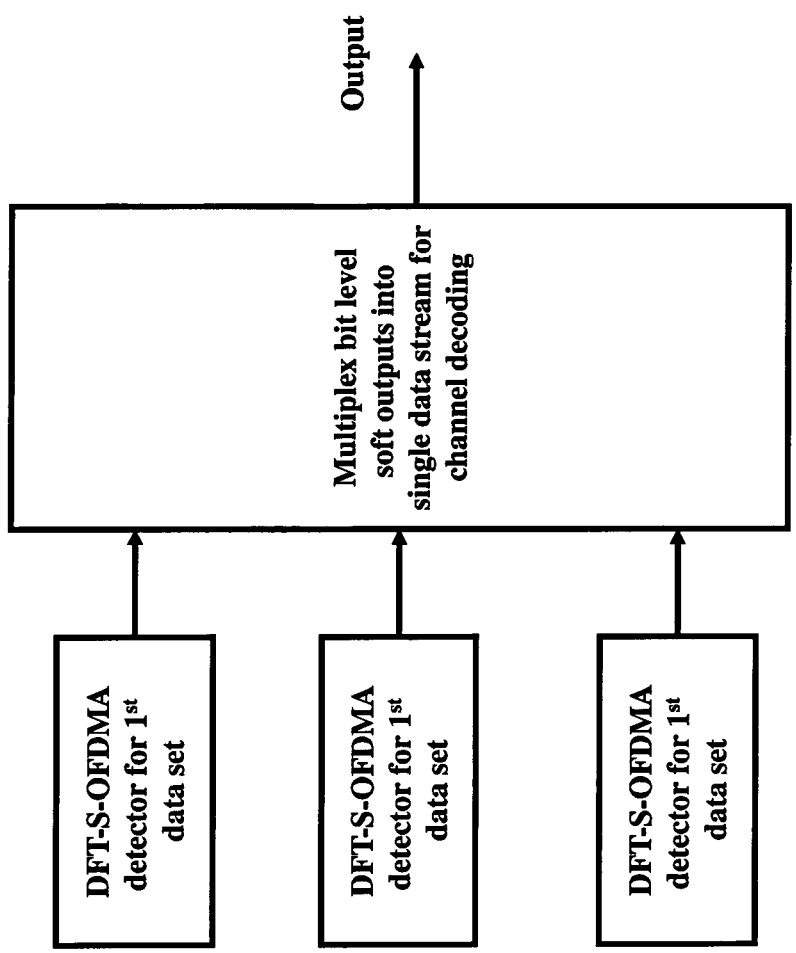
FIG. 23 illustrates the baseband portion of the DFT-S-OFDMA receiver, according to embodiments as disclosed herein.

FIG. 23 illustrates the baseband portion of the DFT-S-OFDMA receiver. Precoded pilot symbols are used to estimate the channel state information and interference covariance estimation. A filter is used to equalize the precoded data tones in frequency domain. The filter weights are computed using the estimated channel and estimated noise-plus-interference covariance. Data is demodulated after IDFT. In typical implementations, the receiver processes either single slot or pairs of slots for channel and interference covariance estimation.

The embodiments disclosed herein can be implemented through at least one software program running on at least one hardware device and performing network management functions to control the network elements. The network elements shown in FIGS. 1, 2 and 3 include blocks which can be at least one of a hardware device, or a combination of hardware device and software module.

The embodiment disclosed herein describes a method and system to achieve transmission diversity and precoding using multiple antennas in wireless networks. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language, or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, the invention may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The invention claimed is:

1. A method for transmission of a signal from a plurality of antennas, in a frequency band, said method comprising:
    splitting said frequency band into a plurality of at least one group of subcarriers; and
    transmitting on each of said at least one group of subcarriers from said plurality of antennas, simultaneously, using a one or two dimensional precoder, wherein said precoder is a complex weight specific to said plurality of antennas and said group of subcarriers, wherein said complex weight further relies on at least one of a time index of said at least one group of subcarriers; and a frequency index of said group of subcarriers, wherein said frequency band is divided into a plurality of frequency partitions, wherein said plurality of frequency partitions are further divided into a plurality of frequency sub partitions, and wherein said plurality of sub partitions comprise of a plurality of Physical Resource Units (PRUs) and said plurality of PRUs are further divided into a plurality of subcarriers.

2. The method as claimed in claim 1, wherein said at least one group of subcarriers comprises of at least one of data and pilots.

3. The method as claimed in claim 1, wherein said complex weight is at least one of a phase rotation and an amplitude variation, wherein said phase rotation and said amplitude variation are chosen deterministically or randomly.

4. The method as claimed in claim 3, wherein offset of said phase rotation between said plurality of antennas takes a value between 0 and $2\pi$, including 0 and $2\pi$.

5. The method, as claimed in claim 1, wherein said plurality of antennas uses Cyclic Delay Diversity (CDD) followed by a time dependent phase rotation.

6. The method as claimed in claim 1, wherein said signal is an Orthogonal Frequency Division Multiple Access (OFDMA) signal.

7. The method as claimed in claim 1, wherein said signal is a Discrete Fourier Transform-Spread Orthogonal Frequency Division Multiple Access (DFT-S-OFDMA) signal.

8. The method as claimed in claim 1, wherein said group of sub carriers comprise of at least one subcarrier.

9. The method as claimed in claim 1, wherein said group of sub carriers comprise of more than one subcarrier.

10. The method as claimed in claim 1, wherein said precoder is selected by:
   grouping said plurality of PRUs into sets, wherein each said set comprise of an arbitrary number of said PRUs;
   classifying said sets into a plurality of sets, wherein elements of said plurality of sets comprise of L physically contiguous PRUs, wherein L is greater than or equal to 1 and may vary with each of said plurality of sets;
   assigning each element of said plurality of sets a logically continuous index i, wherein i takes values from 0, 1, 2, ... $N_L-1$, wherein $N_L$ may vary for each of said plurality of sets;
   determining a precoding matrix W(i,q) of size $N_t*1$ for each element of said set chosen from said plurality of sets, wherein $N_t$ is number of transmitting antennas and said element comprises of said plurality of PRUs; and
   applying said precoding matrix to each element of said set to obtain said precoder and W(i,q) is same for all said PRUs contained in said element.

11. The method as claimed in claim 1, wherein i is assigned to each of said PRU in increasing order.

12. The method as claimed in claim 1, wherein applying said precoding matrix to said element further comprises of applying said precoding matrix to said element with a precoder W(i,q) in each of said PRUs, wherein said precoder is dependent on i and subframe number v.

13. The method as claimed in claim 1, wherein step of determining said precoder further comprises of determining said precoder W(i,q) from a code book C as W(i,q)=C(m), further wherein m=mod [(u+v), M]+1, M is size of said code book C, u=mod [(i,M)] 1.

14. The method as claimed in claim 1, wherein step of determining said precoder further comprises of determining said precoder W(i,q) from a code book C as W(i,q)=C(m), further wherein m=mod [(u+v), M]+1, M is size of said code book C, u=mod [(i,M)]+1.

15. A system for transmission of a signal from a plurality of antennas, in a frequency band, said system comprising a means configured for:
   splitting said frequency band of said signal into a plurality of at least one group of subcarriers; and
   transmitting on each of said at least one group of subcarriers from said plurality of antennas, simultaneously, using a one or two dimensional precoder, wherein said precoder is a complex weight specific to said plurality of antennas, and said group of subcarriers, wherein said complex weight further relies on at least one of a time index of said at least one group of subcarriers; and a frequency index of said group of subcarriers, wherein said frequency band is divided into a plurality of frequency partitions, wherein said plurality of frequency partitions are further divided into a plurality of frequency sub partitions, and wherein said plurality of sub partitions comprise of a plurality of Physical Resource Units (PRUs) and said plurality of PRUs are further divided into a plurality of subcarriers.

16. The system as claimed in claim 15, wherein said system is configured to apply said complex weight specific to said plurality of antennas, wherein said complex weight is at least one of phase rotation and an amplitude variation, wherein said phase rotation and said amplitude variation are chosen deterministically or randomly.

17. The method as claimed in claim 16, wherein offset of said phase rotation between said plurality of antennas takes a value between 0 and $2\pi$, including 0 and $2\pi$.

18. The system, as claimed in claim 16, wherein said system is configured to take arbitrary values of said amplitude variation from a set between 0 and 1, including 0 and 1.

19. The system as claimed in claim 15, wherein said plurality of antennas is configured to use Cyclic delay diversity (CDD) followed by a time dependent phase rotation.

20. The system as claimed in claim 15, wherein said system is configured to use an Orthogonal Frequency Division Multiple Access (OFDMA) signal.

21. The system as claimed in claim 15, wherein said system is configured to use a Discrete Fourier Transform-Spread Orthogonal Frequency Division Multiple Access (DFT-S-OFDMA) signal.

22. The system as claimed in claim 15, wherein said precoder is configured to be selected by steps comprising of:
   grouping said plurality of PRUs into sets, wherein each said set comprise of an arbitrary number of said PRUs;
   classifying said sets into a plurality of sets, wherein elements of said plurality of sets comprise of L physically contiguous PRUs, wherein L is greater than or equal to 1 and may vary with each of said plurality of sets;
   determining a precoding matrix W(i,q) of size $N_t*1$ for each element of said set chosen from said plurality of sets, wherein $N_t$ is number of transmitting antennas and said element comprises of said plurality of PRUs; and
   applying said precoding matrix to each element of said set to obtain said precoder and W(i,q) is same for all said PRUs contained in said element.

23. The system as claimed in claim 22, wherein said system is configured to assign a value of i to each of said PRU in increasing order.

24. The system as claimed in claim 22, wherein said system is configured to apply said precoding matrix to said element, wherein said element further comprises of applying said precoding matrix to said element with a precoder W(i,q) in each of said PRUs, wherein said precoder is dependent on i and subframe number v.

25. The system as claimed in claim 22, wherein said system is configured to determine said precoder W(i,q) from a code book C as W(i,q)=C(m), further wherein m=mod [(u+v), M]+1, M is size of said code book C, u=mod [(i,M)] 1.

26. The system as claimed in claim 22, wherein said system is configured to determine said precoder W(i,q) from a code book C as W(i,q)=C(m), further wherein m=mod [(u+v), M]+1, M is size of said code book C, u=mod [(i,M)]+1.

27. A method for transmission of a signal from a plurality of antennas, in a frequency band, said method comprising:
   splitting said frequency band into a plurality of at least one group of subcarriers; and
   transmitting on each of said at least one group of subcarriers from said plurality of antennas, simultaneously, using a one or two dimensional precoder, wherein said precoder is a complex weight specific to said plurality of antennas and said group of subcarriers, wherein said complex weight further relies on at least one of a time index of said at least one group of subcarriers; and a frequency index of said group of subcarriers, wherein said frequency band is divided into a plurality of frequency partitions, wherein said plurality of frequency partitions are further divided into a plurality of frequency sub partitions, and wherein said plurality of sub partitions comprise of a plurality of Physical Resource Units (PRUs) and said plurality of PRUs are further divided into a plurality of subcarriers, wherein said precoder is selected by:
   grouping said plurality of PRUs into sets, wherein each said set comprise of an arbitrary number of said PRUs;
   classifying said sets into a plurality of sets, wherein elements of said plurality of sets comprise of L physically contiguous PRUs, wherein L is greater than or equal to 1 and may vary with each of said plurality of sets;
   assigning each element of said plurality of sets a logically continuous index i, wherein i takes values from $0, 1, 2, \ldots N_L-1$, wherein $N_L$ may vary for each of said plurality of sets;
   determining a precoding matrix W(i,q) of size $N_t*1$ for each element of said set chosen from said plurality of sets, wherein $N_t$ is number of transmitting antennas and said element comprises of said plurality of PRUs; and
   applying said precoding matrix to each element of said set to obtain said precoder and W(i,q) is same for all said PRUs contained in said element.

* * * * *